(12) United States Patent
Mizushiro

(10) Patent No.: US 10,397,533 B2
(45) Date of Patent: Aug. 27, 2019

(54) PROJECTION SYSTEM AND METHOD FOR ADJUSTING PROJECTION SYSTEM

(71) Applicant: SEIKO EPSON CORPORATION, Tokyo (JP)

(72) Inventor: Kenji Mizushiro, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/635,746

(22) Filed: Jun. 28, 2017

(65) Prior Publication Data

US 2018/0013995 A1 Jan. 11, 2018

(30) Foreign Application Priority Data

Jul. 5, 2016 (JP) ................................. 2016-133079

(51) Int. Cl.
*H04N 9/31* (2006.01)
*G03B 21/13* (2006.01)
*G03B 21/14* (2006.01)

(52) U.S. Cl.
CPC ........... *H04N 9/3185* (2013.01); *G03B 21/13* (2013.01); *H04N 9/3147* (2013.01); *H04N 9/3179* (2013.01); *H04N 9/3194* (2013.01); *G03B 21/147* (2013.01)

(58) Field of Classification Search
CPC .. H04N 9/3147; H04N 9/3179; H04N 9/3182; H04N 9/3188; H04N 9/3185; H04N 5/3415; H04N 5/235; H04N 5/23238; H04N 1/3876; G03B 37/04; G03B 21/208; G03B 21/147; G03B 21/13; G03B 21/2013; G03B 35/20; G03B 17/54; G02B 27/2214; G02B 27/0179
See application file for complete search history.

(56) References Cited

U.S. PATENT DOCUMENTS

| | | | | |
|---|---|---|---|---|
| 5,734,446 A | * | 3/1998 | Tokoro | ..................... H04N 9/31 348/383 |
| 6,513,938 B2 | * | 2/2003 | Kubota | .................. G03B 21/10 348/E5.144 |
| 6,695,451 B1 | * | 2/2004 | Yamasaki | ................ H04N 9/12 348/E5.144 |
| 6,753,923 B2 | * | 6/2004 | Gyoten | ................ H04N 9/3147 348/383 |
| 8,102,332 B2 | * | 1/2012 | Nelson | ..................... H04N 9/31 345/1.1 |

(Continued)

FOREIGN PATENT DOCUMENTS

| | | |
|---|---|---|
| JP | 2003-018415 A | 1/2003 |
| JP | 2006-113151 A | 4/2006 |
| JP | 2013-025076 A | 2/2013 |

*Primary Examiner* — Dismery Mercedes
(74) *Attorney, Agent, or Firm* — Oliff PLC

(57) ABSTRACT

A projection system includes three or more projectors. Each of the projectors includes a projection section that projects image light to form a projection image on a screen. The projectors are so arranged that the three or more projection images projected by the projectors form a tiled image. The projection image projected by any of the projectors and the projection image projected by an adjacent projector form an overlapping area where the projection images overlap with each other, and one of the overlapping areas differs from the other overlapping areas in terms of size.

9 Claims, 12 Drawing Sheets

(56) References Cited

U.S. PATENT DOCUMENTS

| | | | | |
|---|---|---|---|---|
| 8,866,902 B2* | 10/2014 | Furui | ............... | G03B 21/14 348/135 |
| 9,082,330 B2* | 7/2015 | Kotani | ............... | H04N 9/3147 |
| 9,497,432 B2* | 11/2016 | Okamoto | ............... | H04N 9/3147 |
| 9,621,861 B2* | 4/2017 | Hiranuma | ............... | H04N 9/3185 |
| 9,661,257 B2* | 5/2017 | Ishikawa | ............... | G06T 3/005 |
| 9,761,158 B2* | 9/2017 | Ouchi | ............... | G09G 3/002 |
| 2001/0022651 A1* | 9/2001 | Kubota | ............... | G03B 21/10 353/94 |
| 2002/0054275 A1* | 5/2002 | Yamanaka | ............... | G03B 21/26 353/30 |
| 2003/0035157 A1 | 2/2003 | Kanai | | |
| 2005/0206857 A1* | 9/2005 | Yamada | ............... | G03B 21/56 353/94 |
| 2008/0143969 A1* | 6/2008 | Aufranc | ............... | G03B 21/26 353/30 |
| 2011/0019108 A1* | 1/2011 | Nelson | ............... | H04N 9/31 348/745 |
| 2011/0211065 A1* | 9/2011 | Furui | ............... | G03B 21/14 348/135 |
| 2011/0310354 A1* | 12/2011 | Fujimori | ............... | G03B 21/13 353/31 |
| 2013/0141475 A1* | 6/2013 | Kotani | ............... | G09G 5/001 345/690 |
| 2015/0029465 A1* | 1/2015 | Ishikawa | ............... | G06T 3/005 353/30 |
| 2015/0077573 A1* | 3/2015 | Ishikawa | ............... | G06T 3/005 348/189 |
| 2015/0138240 A1* | 5/2015 | Hiranuma | ............... | H04N 9/3185 345/634 |
| 2015/0237317 A1* | 8/2015 | Ehara | ............... | H04N 9/3185 348/745 |
| 2016/0162246 A1* | 6/2016 | Ouchi | ............... | G06F 3/1431 345/1.3 |
| 2017/0142384 A1* | 5/2017 | Yoshimura | ............... | H04N 9/3147 |
| 2017/0163948 A1* | 6/2017 | Morisawa | ............... | G06F 3/1446 |

* cited by examiner

PROJECTION SYSTEM AND METHOD FOR ADJUSTING PROJECTION SYSTEM

CROSS-REFERENCE

The entire disclosure of Japanese Patent Application No. 2016-133079, filed Jul. 5, 2016 is expressly incorporated by reference herein.

BACKGROUND

1. Technical Field

The present invention relates to a projection system and a method for adjusting the projection system.

2. Related Art

There is a known system of related art in which a plurality of projectors are arranged and project a tiled image. In a system of this type, part of an image projected by each of the projectors is caused to overlap with an image projected by an adjacent projector, and adjustment is so made that unevenness of luminance and color is unnoticeable in the overlapping area where the projection images overlap with each other (see JP-A-2013-25076, for example). In the configuration described in JP-A-2013-25076, an unevenness correction LUT (lookup table) is used to adjust the luminance of the projection images in the overlapping area. In more detail, also in consideration of the difference in luminance and the difference in color between the overlapping area and the area therearound, unevenness of the luminance and color in the overlapping area is reduced, and the difference in the luminance and color between the overlapping area and the projection images other than the overlapping area is also reduced.

The effect of the adjustment performed on the overlapping area is restricted by the luminance characteristics of each of the projectors that project projection images in the overlapping area. A method for more effectively adjusting the unevenness in the overlapping area has therefore been desired.

SUMMARY

An advantage of some aspects of the invention is to allow images projected by a plurality of projectors to be so combined with one another as to form a tiled image in such a way that unevenness in an overlapping area where the projected images overlap with each other is effectively adjusted.

An aspect of the invention is directed to a projection system including three or more projectors. Each of the projectors includes a projection section that projects image light to form a projection image on a projection surface. The projectors are so arranged that the three or more projection images projected by the three or more projectors form a tiled image. The projection image projected by one of the projectors and the projection image projected by another one of the projectors adjacent to the one of the projectors form an overlapping area where the projection images overlap with each other, and one of the overlapping areas differs from the other overlapping areas in terms of size.

According to the aspect of the invention, in the case where the projection images projected by the three or more projectors are so arranged as to include the overlapping areas to form a tiled image, providing a difference in size among the overlapping areas allows precise adjustment of part of the overlapping areas. Therefore, for example, unevenness in an overlapping area located in a noticeable position in the tiled image can be precisely adjusted. The unevenness in the overlapping areas in the tiled image can therefore be effectively corrected.

In the aspect of the invention, one of the overlapping areas may differ from the other overlapping areas in terms of size in a predetermined direction in which the projectors are arranged.

According to the aspect of the invention with this configuration, providing a difference in size among the overlapping areas in the predetermined direction in which the projectors are arranged allows precise adjustment of unevenness correction in the predetermined direction in part of the overlapping areas.

In the aspect of the invention, the projectors may be formed of four or more projectors, the projectors may be so arranged that the three or more overlapping areas are arranged in a predetermined direction in the tiled image, and the overlapping area located in a position on a side facing a center of the tiled image in the predetermined direction may be larger than the overlapping areas located in positions on sides facing ends of the tiled image.

According to the aspect of the invention with this configuration, in the case where projection images projected by the four or more projectors are so arranged as to include the overlapping areas to form a tiled image, providing a difference in size among the overlapping areas allows precise adjustment of part of the overlapping areas. Therefore, for example, in the tiled image containing three or more overlapping areas, unevenness in an overlapping area located in a position close to the center of the tiled image can be precisely adjusted. The unevenness in the overlapping areas in the tiled image can therefore be effectively corrected.

In the aspect of the invention, the overlapping area located in the position on the side facing the center of the tiled image in the predetermined direction may be larger than the overlapping areas located in the positions on the sides facing the ends of the tiled image in terms of size in a predetermined direction which the projectors are arranged.

According to the aspect of the invention with this configuration, providing a difference in size among the overlapping areas in the predetermined direction in which the projectors are arranged allows precise adjustment of unevenness correction in the predetermined direction in part of the overlapping areas.

In the aspect of the invention, the plurality of projectors may be so arranged that among the plurality of projection images, one or more projection images located on a side facing a center of the tiled image have luminance higher than luminance of the other projection images located in positions on sides facing ends of the tiled image.

According to the aspect of the invention with this configuration, an overlapping area located in a noticeable position in the tiled image can be precisely adjusted.

In the aspect of the invention, the projection system may further include an image processor including an arrangement determining section that determines arrangement of the plurality of projectors based on characteristics of each of the projectors and a guidance display control section that causes the projectors to project images showing an installation state of the projectors in accordance with the arrangement determined by the arrangement determining section.

According to the aspect of the invention with this configuration, the arrangement can be determined on the basis of the characteristics of the projectors, and the task of installing the projectors can be guided in accordance with the determined arrangement. Unevenness in one or more overlapping areas contained in the tiled image can therefore be more precisely adjusted. Further, the task of installing the projectors can be assisted.

In the aspect of the invention, the image processor may further include a divider section that divides an image to be projected to generate divided images to be projected by the projectors, a storage section that stores correction data, a correction section that corrects the divided images generated by the divider section based on the correction data stored in the storage section, and an output section that outputs the divided images corrected by the correction section to the projectors.

According to the aspect of the invention with this configuration, the plurality of projectors are installed in accordance with the arrangement determined on the basis of the characteristics of the projectors, and images in which unevenness in the overlapping areas is corrected are outputted to the thus installed projectors, whereby a tiled image in which the overlapping areas are precisely adjusted can be projected.

In the aspect of the invention, the guidance display control section may generate the images showing the installation state of the projectors in accordance with the arrangement determined by the arrangement determining section, and the output section may output the images generated by the guidance display control section to the projectors.

According to the aspect of the invention with this configuration, the above-mentioned function of the image processor can assist the task of installing the projectors.

In the aspect of the invention, the projection system may further include a correction data generating section that generates the correction data, in accordance with which unevenness in the overlapping areas is corrected, based on the arrangement of the plurality of projectors determined by the arrangement determining section, and the storage section may store the correction data generated by the correction data generating section.

According to the aspect of the invention with this configuration, the above-mentioned function of the image processor can generate the correction data for adjusting the overlapping areas and supply the projectors with adjusted images.

In the aspect of the invention, among the overlapping areas, the overlapping area located in a position facing a center of the tiled image may have a size that allows the correction section to correct a difference in luminance among the overlapping areas to a value that falls within a set range.

According to the aspect of the invention with this configuration, in the tiled image, the overlapping area located in a noticeable center-side position can be more precisely corrected.

In the aspect of the invention, the tiled image may include a first overlapping area as one of the overlapping areas. The arrangement determining section may carry out a size determination process of determining a size of the first overlapping area based on luminance provided by first and second projectors that project images that form the first overlapping area. In the size determination process, in each of the image projected by the first projector and the image projected by the second projector, the arrangement determining section may find a ratio of luminance at a boundary of the first overlapping area to peak luminance of the projection image and determine the size of the first overlapping area based on the obtained ratios.

According to the aspect of the invention with this configuration, the sizes of the overlapping areas can be so determined as to be suitable for unevenness adjustment. The unevenness in the overlapping areas in the tiled image can therefore be more precisely corrected.

Another aspect of the invention is directed to a method for adjusting a projection system that includes three or more projectors and projects a tiled image containing projection images projected by the projectors, the method including arranging the projectors in such a way that the three or more projection images projected by the three or more projectors form the tiled image and adjusting projection directions of the projectors in such a way that the projection image projected by one of the projectors and the projection image projected by another one of the projectors adjacent to the one of the projectors form an overlapping area where the projection images overlap with each other and one of the overlapping areas differs from the other overlapping areas in terms of size.

According to the aspect of the invention, in the case where projection images projected by the three or more projectors are so arranged as to include the overlapping areas to form a tiled image, providing a difference in size among the overlapping areas allows precise adjustment of part of the overlapping areas. Therefore, for example, unevenness in an overlapping area located in a noticeable position in the tiled image can be precisely adjusted. The unevenness in the overlapping areas in the tiled image can therefore be effectively corrected.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
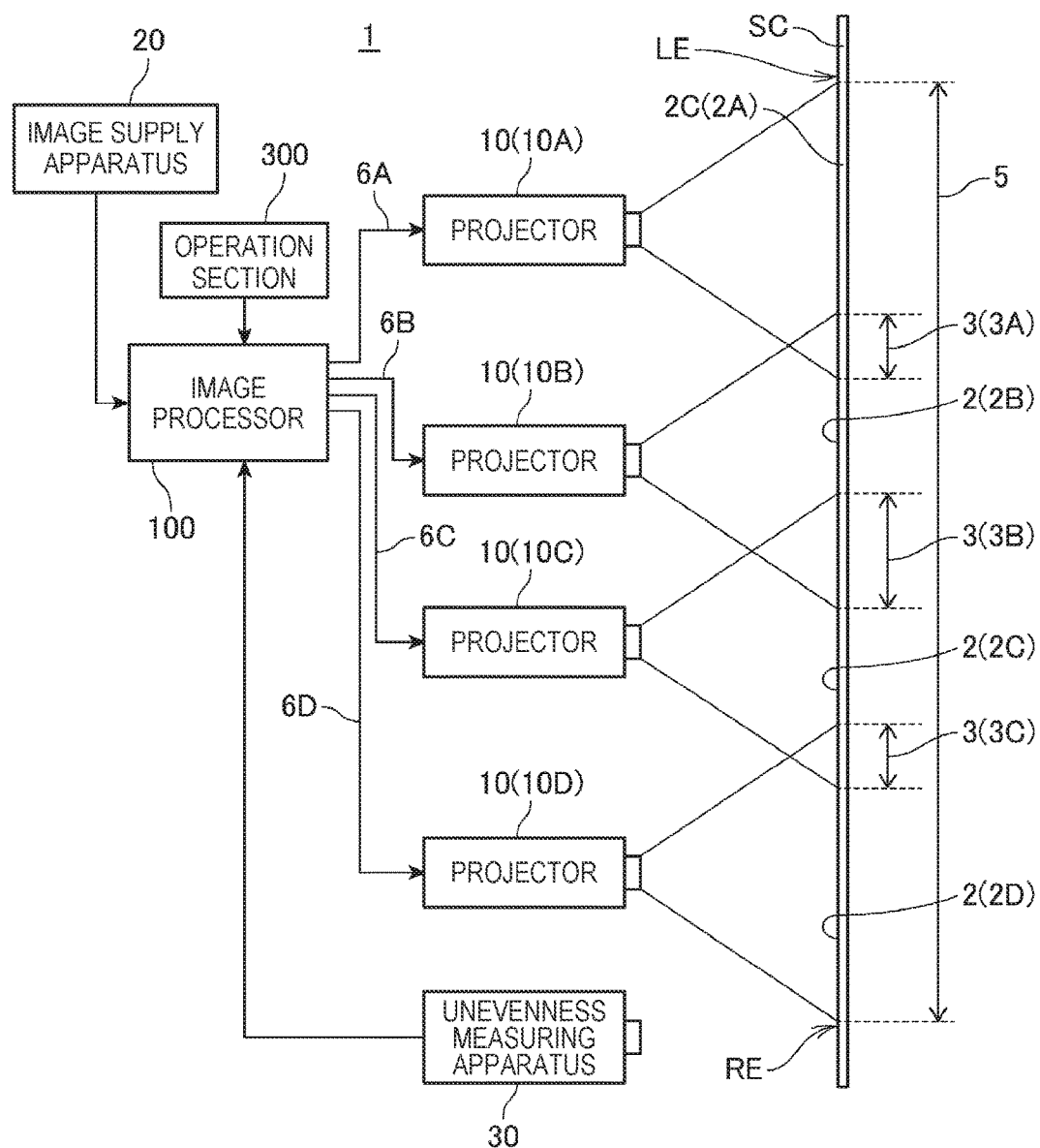
FIG. 1 shows a schematic configuration of a projection system according to a first embodiment.

FIG. 1 is a block diagram showing the configuration of a projection system 1 according to a first embodiment to which the invention is applied.

The projection system 1 includes a plurality of projectors 10, which form a multi-projection system. The number of projectors 10 is preferably three or greater, more preferably, four or greater. The present embodiment will be described with reference to a case where four projectors 10A, 10B, 10C, and 10D are provided by way of example.

The four projectors 10A, 10B, 10C, and 10D project projection images 2A, 2B, 2C, and 2D, respectively, on a screen SC (projection surface). The projection images 2A, 2B, 2C, and 2D form a tiled image 5, which is a large image as a whole, on the screen SC. In FIG. 1, the screen SC is shown in a plan view, in which the upper side in FIG. 1 corresponds to a left end LE of the screen SC and the lower side in FIG. 1 corresponds to a right end RE of the screen SC. Each of the four projection images 2 overlaps with an adjacent projection image 2, and the two projection images form an overlapping area 3. In the example shown in FIG. 1, the projection image 2A and the projection image 2B overlap with each other to form an overlapping area 3A, the projection image 2B and the projection image 2C overlap with each other to form an overlapping area 3B, and the projection image 2C and the projection image 2D overlap with each other to form an overlapping area 3C.

In the following description, in a case where the projectors 10A, 10B, 10C, and 10D do not need to be distinguished from one another, they are referred to as the projectors 10. In a case where the projection images 2A, 2B, 2C, and 2D do not need to be distinguished from one another, they are referred to as the projection images 2. In a case where the overlapping areas 3A, 3B, and 3C do not need to be distinguished from one another, they are referred to as the overlapping areas 3.

An image processor 100 is connected to the projectors 10A, 10B, 10C, and 10D. The image processor 100 divides an image outputted by an image supply apparatus 20 to generate an image projected by the projector 10A, an image projected by the projector 10B, an image projected by the projector 10C, and an image projected by the projector 10D. Images into which an original image is thus divided are called divided images. The image processor 100 outputs divided image data 6A, 6B, 6C, and 6D, which are image data on the divided images, to the projectors 10A, 10B, 10C, and 10D, respectively. The projectors 10A, 10B, 10C, and 10D project the projection images 2A, 2B, 2C, and 2D on the basis of the divided image data 6A, 6B, 6C, and 6D to project the tiled image 5.

Figure 2:
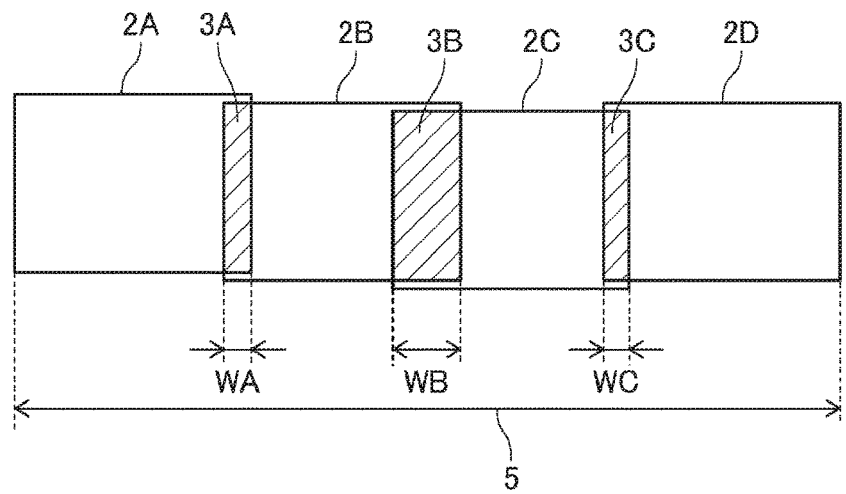
FIG. 2 shows the configuration of a tiled image.

FIG. 2 shows the configuration of the tiled image 5 and is a front view of the tiled image 5 projected on the screen SC (FIG. 1). In FIG. 2, the projection images 2 are shifted from each other in the upward/downward direction for ease of understanding, but the projection images 2 are actually aligned with one another at the same height level.

The tiled image 5 is so configured that the projection images 2A, 2B, 2C, and 2D are sequentially arranged from the left. In the present configuration, the overlapping areas 3A, 3B, and 3C can be sized differently from one another. In the example shown in FIG. 2, the width WB of the overlapping area 3B is greater than the width WA of the overlapping area 3A and the width WC of the overlapping area 3C. Since the overlapping area 3B is located in a position close to (on the side facing) the center of the tiled image 5, decrease or unevenness in luminance in the overlapping area 3B is likely to be noticeable. That is, a viewer who is in front of the screen SC and views the tiled image 5 perceives unevenness of luminance in the overlapping area 3B as unevenness more noticeable than that in the overlapping area 3A or 3C. In the projection system 1, to correct the unevenness in the overlapping area 3B in such a way that the unevenness is unlikely to be noticeable, the width WB of the overlapping area 3B is set at a value suitable for the correction.

The overall size of the tiled image 5 (lateral width in the present embodiment) is determined in advance. The total of the sizes of the overlapping areas 3A, 3B, and 3C, that is, the sum of the widths WA, WB, and WC is therefore fixed. Therefore, after the width WB is determined, the widths WA and WC are determined on the basis of the specified overall size of the tiled image 5.

The present embodiment has been described with reference to the case where the projectors 10A, 10B, 10C, and 10D are arranged in the horizontal direction and the projection images 2A, 2B, 2C, and 2D arranged in the horizontal direction form the tile image 5. The widths WA, WB, and WC in the horizontal direction are therefore considered as the sizes of the overlapping areas 3, but not necessarily in the invention, and the projectors 10 may be stacked on each other in the vertical direction and project a tiled image. In this case, the sizes of the overlapping areas in the upward/downward direction and/or the sizes thereof in the horizontal (width) direction may be considered as the sizes of the overlapping areas.

Referring back to FIG. 1, the image supply apparatus 20 and an unevenness measuring apparatus 30 are connected to the image processor 100.

The image supply apparatus 20 supplies the image processor 100 with image data corresponding to images to be so displayed as to form a tiled image. The image data supplied by the image supply apparatus 20 may be formed of still images or motion images. The functions of the image supply apparatus 20 are achieved by a DVD (digital versatile disc) apparatus or any other medium reproducing apparatus, a personal computer (PC), or any other apparatus. The image processor 100 may have part or entirety of the functions of the image supply apparatus 20.

The unevenness measuring apparatus 30 includes an imaging section that captures an image of a range that covers the screen SC and analyzes captured image data to perform measurement associated with correction of unevenness in the images projected on the screen SC. The imaging section provided in the unevenness measuring apparatus 30 includes a CCD (charge coupled device) sensor, a CMOS (complementary metal oxide semiconductor) sensor, or any other image sensor. The imaging section performs imaging at the angle of view that covers the screen SC to generate captured image data. The unevenness measuring apparatus 30 analyzes the captured image data to detect the luminance of the images projected on the screen SC in each position on the screen SC.

Before the unevenness measuring apparatus 30 performs the measurement, the image supply apparatus 20 outputs image data on unevenness measurement patterns to the image processor 100. The projection system 1 projects solid images (measurement patterns, which will be described later) on the screen SC. The unevenness measuring apparatus 30 captures an image of the screen SC on which at least one of the projection images 2A, 2B, 2C, and 2D formed of the solid images is projected. The unevenness measuring apparatus 30 acquires two-dimensional distribution information on in-plane XYZ tristimulus values on the basis of the captured image data. The unevenness measurement patterns can be gray images and halftone solid images showing 0 to 100% gradations of each of the RGB color components (images each formed of pixels having same pixel value). The unevenness measuring apparatus 30 is, for example, an apparatus that uses a filter having spectral sensitivity approximated by an xyz color matching function to capture an image and performs matrix correction operation on the image to produce XYZ tristimulus values (such as ProMetric manufactured by Radiant Imaging). The data captured by the unevenness measuring apparatus 30 is transmitted as measured unevenness values to the image processor 100. The image processor 100 may have a built-in controller for controlling the unevenness measurement performed by the unevenness measuring apparatus 30. On the basis of the values measured by the unevenness measuring apparatus 30, the projection system 1 can detect, for example, peak luminance of each of the projection images 2A, 2B, 2C, and 2D and luminance in a specific position on each of the projection images 2A, 2B, 2C, and 2D, as will be described later. The projection system 1 can further detect, for example, luminance unevenness of each of the projection images 2A, 2B, 2C, and 2D and detect luminance unevenness of each of the overlapping areas 3A, 3B, and 3C.

The image processor 100 performs image correction, such as unevenness correction, on input image data inputted from the image supply apparatus 20 in accordance with the type of resolution of images for discrete image display or display of the tiled image 5 and color characteristics (display characteristics) of each of the projectors 10. The unevenness correction is image processing that reduces or eliminates unevenness of luminance in the overlapping areas 3. The image processor 100 divides the input image data inputted from the image supply apparatus 20 and then performs the unevenness correction. The image processor 100 outputs the processed image data in the form of the divided image data 6A, 6B, 6C, and 6D to the four projectors 10. The above-mentioned function of the image processor 100 is achieved by a software process achieved by a configuration having a central processing unit (CPU) and a memory or a logic circuit, such as an ASIC (application specific integrated circuit).

Figure 3:
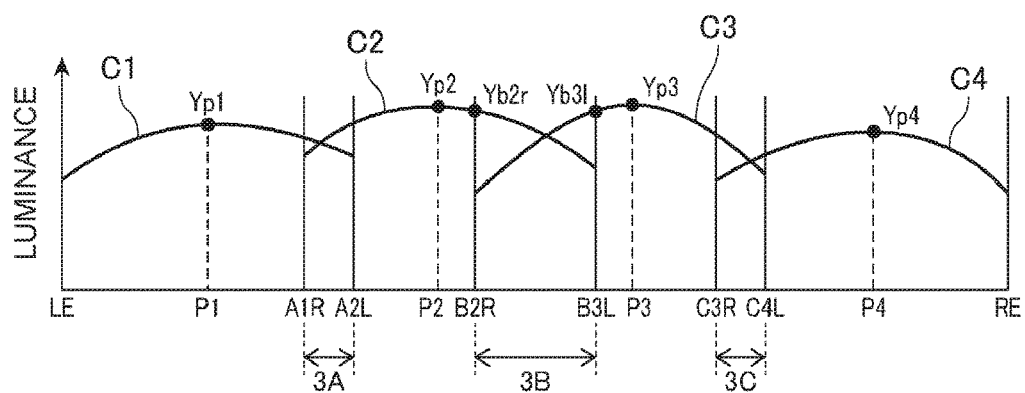
FIG. 3 is a diagrammatic view showing the luminance distribution of the tiled image.
Figure 4:
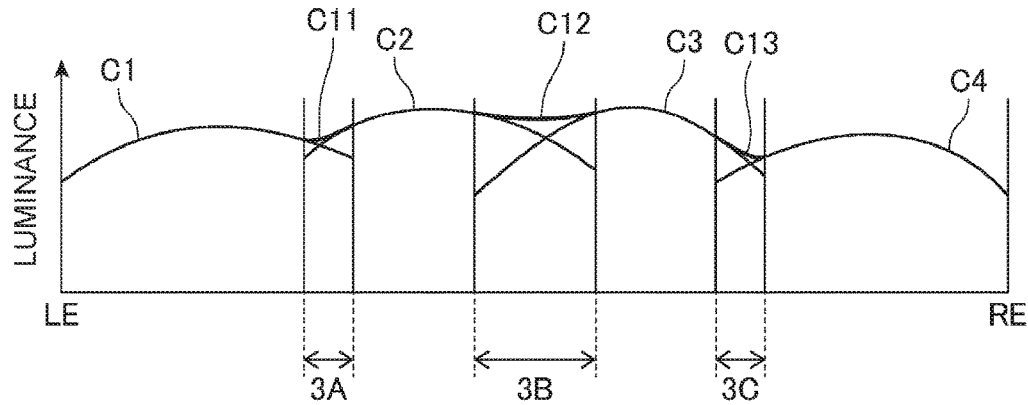
FIG. 4 is a diagrammatic view showing correction of the luminance of the tiled image.

FIG. 3 is a diagrammatic view showing the luminance distribution of the tiled image 5. FIG. 4 is a diagrammatic view showing correction of the luminance of the tiled image 5.

FIGS. 3 and 4 show graphs drawn in accordance with an abscissa corresponding to the rightward/leftward direction of the tiled image 5 projected on the screen SC and an ordinate representing the luminance. The right end and the left end (origin) of the horizontal axis correspond to the right end RE and the left end LE of the screen SC. That is, FIGS. 3 and 4 show graphs representing the correlation between the position in the horizontal direction of the screen SC and the luminance. FIGS. 3 and 4 show the luminance distribution along one line selected from the horizontal lines that form the tiled image 5. The luminance distributions along the other lines are the same as the luminance distribution shown in FIG. 3 or 4 or differ therefrom. In FIG. 3 or 4 or the following description, it is not intended that the luminance distributions along all lines of the tiled image 5 on the screen SC are the same as that shown in FIG. 3 or 4.

The luminance shown in FIGS. 3 and 4 can be detected, for example, by the unevenness measuring apparatus 30 on the basis of the captured image data.

In FIG. 3, a curve C1 represents the luminance of the projection image 2A projected by the projector 10A. A curve C2 represents the luminance of the projection image 2B projected by the projector 10B, and a curve C3 represents the luminance of the projection image 2C projected by the projector 10C. A curve C4 represents the luminance of the projection image 2D projected by the projector 10D. A typical projector is characterized in that the luminance of a projection image 2 peaks at the center thereof or in a region around the center and decreases with distance toward the ends of the projection image 2, as indicated by the curves C1 to C4. Further, the curves C1 to C4 differ from one another in terms of the position of peak luminance, the maximum luminance, and the correlation between the position and the luminance. The differences represent individual differences in luminance characteristics among the four projectors 10.

In the process of determining the arrangement of the four projectors 10, the image processor 100 selects two projectors 10 having high maximum luminance values (projectors 10B and 10C in the description) and arranges them in the positions on the side facing the center of the tiled image 5. The overlapping area 3B is then so set as to be larger than the overlapping areas 3A and 3C. The size setting is suitable for reduction in the luminance unevenness in the overlapping area 3B and reduction in the difference in luminance between the overlapping area 3B and the area other than the overlapping area 3B.

FIG. 4 shows the correlation between the luminance and the position after the image processor 100 performs the unevenness correction. A curve C11 represents the corrected luminance in the overlapping area 3A. A curve C12 represents the corrected luminance in the overlapping area 3B. A curve C13 represents the corrected luminance in the overlapping area 3C. Increasing the size of the overlapping area 3B allows suppression of decrease in the luminance represented by the curve C12, whereby the curve C12 is smoothly connected to the curves C2 and C3. In this case, a high-quality tiled image 5 can be so projected as to give a person who looks at the tiled image 5 no strange feeling resulting from change or unevenness in the luminance in the overlapping area 3B.

Figure 5:
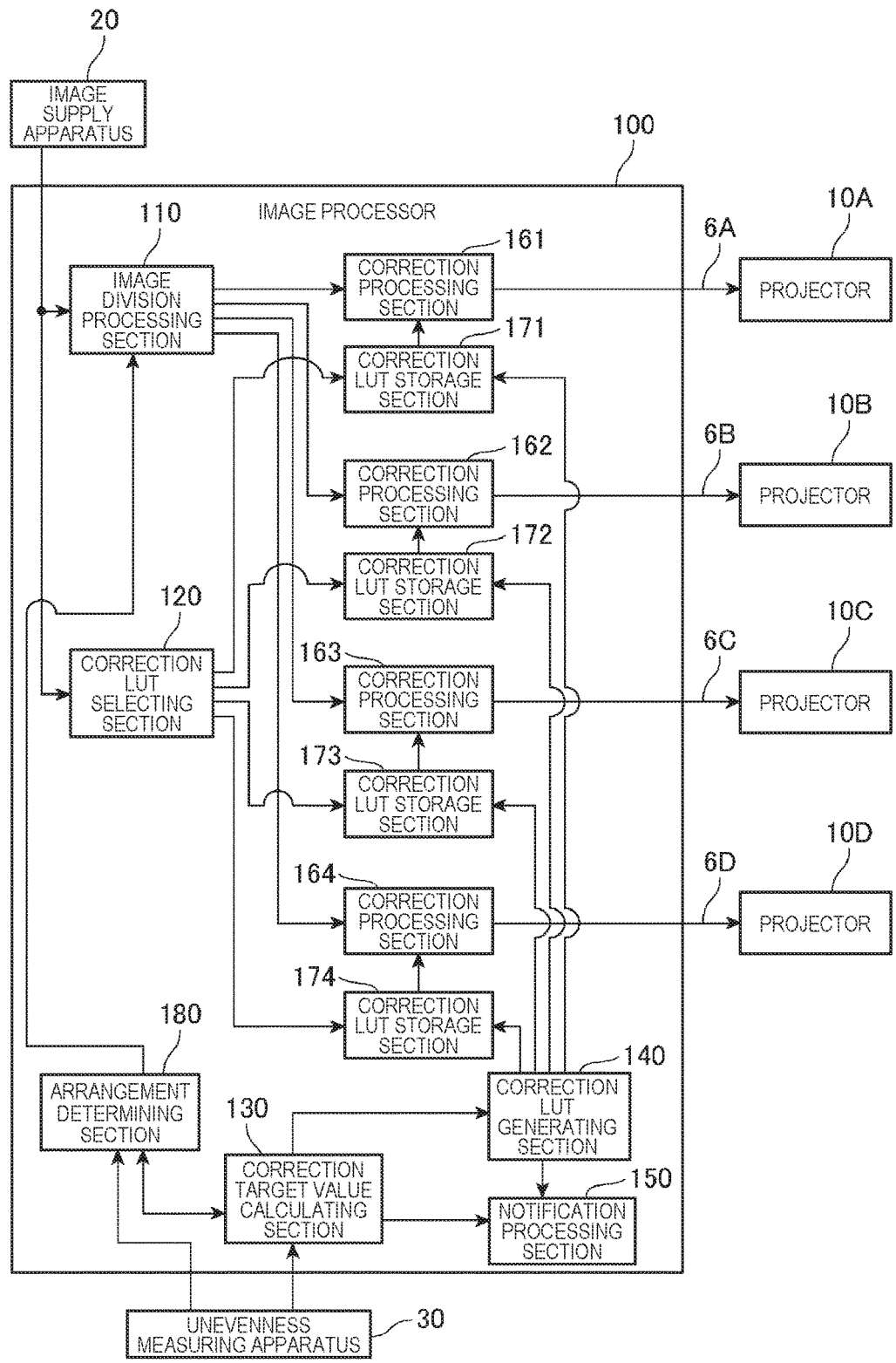
FIG. 5 is a functional block diagram of an image processor.

FIG. 5 is a functional block diagram of the image processor 100.

The image supply apparatus 20, the unevenness measuring apparatus 30, and the four projectors 10 in FIG. 1 are also shown in FIG. 5 for ease of description.

The image processor 100 includes an image division processing section 110, a correction LUT (lookup table) selecting section 120, a correction target value calculating section 130, a correction LUT table generating section 140, a notification processing section 150, and an arrangement determining section 180. The image processor 100 further includes correction processing sections 161 to 164 and correction LUT storage sections 171 to 174. The correction processing section 161 and the correction LUT storage section 171 correspond to the projector 10A. The correction processing section 162 and the correction LUT storage section 172 correspond to the projector 10B, and the correction processing section 163 and the correction LUT storage section 173 correspond to the projector 10C. The correction processing section 164 and the correction LUT storage section 174 correspond to the projector 10D.

The arrangement determining section 180 determines the arrangement of the projectors 10A, 10B, 10C, and 10D on the basis of the values measured by the unevenness measuring apparatus 30. The arrangement determining section 180 determines the order in accordance with which the projectors 10A, 10B, 10C, and 10D are arranged. Specifically, the arrangement determining section 180 compares the maximum luminance values of the projection images 2A, 2B, 2C, and 2D with one another to determine the order of the projectors 10A, 10B, 10C, and 10D in descending order of the maximum luminance. The arrangement determining section 180 arranges a projector 10 having high maximum luminance in a position close to the center in the arrangement of the four projectors 10. In the present embodiment, the four projectors 10 are arranged in a single row. The arrangement order is then so determined that the overlapping area 3B, among the overlapping areas 3A, 3B, and 3C, which is located in a position close to the center in the arrangement, is formed by an image projected by the projector having the highest maximum luminance and an image projected by the projector having the second highest maximum luminance.

The arrangement determining section 180 further determines the sizes of the overlapping areas 3A, 3B, and 3C. The arrangement determining section 180 finds sizes allocable to the overlapping areas 3A, 3B, and 3C on the basis of the size of the tiled image 5 and the resolution of the input image data inputted from the image supply apparatus 20. Instead, when conditions concerning the sizes of the overlapping areas 3A, 3B, and 3C are inputted by operation performed on an operation section 300 (FIG. 1), the arrangement determining section 180 finds sizes allocable to the overlapping areas 3A, 3B, and 3C in accordance with the conditions. The size of each of the overlapping areas 3 can be expressed by the resolution (number of pixels) in the horizontal direction of the screen SC in the present embodiment. The arrangement determining section 180 determines the sizes of the overlapping areas 3 in such a way that the size of the overlapping area 3B located in a position on the side facing the center in the arrangement is greater than the sizes of the overlapping areas 3A and 3C, which are located in positions on the side facing the ends of the arrangement, and the size of the overlapping area 3A or 3C is not smaller than or equal to zero.

The image division processing section 110 (divider section) performs image division on an image signal from the image supply apparatus 20 in accordance with the setting of the overlapping areas determined by the arrangement determining section 180. The divided image signals are outputted to the correction processing sections 161 to 164.

The image division processing section 110 (guidance display controlling section) further generates guidance images for installation of the four projectors 10 in accordance with the arrangement order of the projectors 10 determined by the arrangement determining section 180 and the sizes of the overlapping areas 3. The guidance images, which are projected by the projectors 10, are images for displaying, on the screen SC, the position where the projectors 10 are arranged or the order in accordance with which the projectors 10 are arranged. Further, each of the guidance images contains a positioning figure that allows positioning of a projection image 2 from an adjacent projector 10.

In the example shown in the present embodiment, the projection image 2A projected by the projector 10A is located at the left end, and the projection images 2B, 2C, and 2D are arranged in this order from left to right, as shown in FIG. 2. In correspondence with the thus arranged projection images 2, the projectors 10B, 10C, and 10D are arranged on the right of the projector 10A.

For example, the image division processing section 110 generates image data on a guidance image for the projector 10A and outputs the image data to the correction processing section 161. The guidance image for the projector 10A displays letters (including numerals) or an image representing the position of the projector 10A in the row of the four projectors 10. The guidance image for the projector 10A further contains an image, such as a straight line, a symbol, a dot, or any other object representing the position where the projection image 2A and the projection image 2B overlap with each other. The image represents, for example, the position of the end of the overlapping area 3A in the projection image 2A. The image instead represents, for example, the position of the end of the overlapping area 3A or the position of the end of the overlapping area 3B in the projection image 2B.

A user who installs the projection system 1 installs the projectors 10A to 10D in the order indicated by the guidance images (projection images 2) projected by the projectors 10A to 10D. The user then adjusts the position/projection direction of each of the projectors 10A and 10B in such a way that the image contained in the projection image 2A overlaps with the image contained in the projection image 2B. Similarly, the user adjusts the position/projection direction of the projector 10C in such a way that the image contained in the projection image 2B overlaps with the image contained in the projection image 2C. The user adjusts the position/projection direction of the projector 10D in such a way that the image contained in the projection image 2C overlaps with the image contained in the projection image 2D.

The correction LUT selecting section 120 selects one of a plurality of unevenness correction LUTs (correction data) stored in the correction LUT storage section 171. The correction LUT selecting section 120 may select an unevenness correction LUT in accordance with the type of the image signal (discrete image display or tiled image display) from the image supply apparatus 20 or the arrangement of the projectors. The correction LUT selecting section 120 may still instead select an unevenness correction LUT on the basis of operation information from the operation section 300. The correction LUT selecting section 120 may instead select an unevenness correction LUT on the basis of information contained in the image signal itself from the image supply apparatus 20 or a result of the analysis of the input image. Similarly, the correction LUT selecting section 120 selects one of a plurality of unevenness correction LUTs stored in the correction LUT storage section 172. The correction LUT selecting section 120 further selects one of a plurality of unevenness correction LUTs stored in the correction LUT storage section 173 and one of a plurality of unevenness correction LUTs stored in the correction LUT storage section 174.

The correction target value calculating section 130 computes an unevenness correction target value on the basis of measured unevenness values associated with each of the projection images 2 and measured by the unevenness measuring apparatus 30. The correction target value calculating section 130 computes the unevenness correction target value in at least part of the overlapping areas 3A, 3B, and 3C in accordance with the setting of the overlapping areas 3 set via the operation section 300.

The correction LUT generating section 140 (correction data generating section) generates the unevenness correction LUTs, each of which is a table containing unevenness correction values for performing the unevenness correction, on the basis of the unevenness correction target value computed by the correction target value calculating section 130. The correction LUT generating section 140 generates unevenness correction LUTs for each of the projectors 10A, 10B, 10C, and 10D. The correction LUT generating section 140 outputs the generated unevenness correction LUTs to the correction LUT storage sections 171, 172, 173, and 174 and stores the LUTs in the storage sections.

Each of the correction LUT storage sections 171 to 174 is formed of a memory, such as an SRAM (static random access memory), and a controller that performs write control and read control on the memory.

The correction LUT storage section 171 stores the unevenness correction LUTs generated by the correction LUT generating section 140 in correspondence with the projector 10A. The correction LUT storage section 172 stores the unevenness correction LUTs generated by the correction LUT generating section 140 in correspondence with the projector 10B. The correction LUT storage section 173 stores the unevenness correction LUTs generated by the correction LUT generating section 140 in correspondence with the projector 10C. The correction LUT storage section 174 stores the unevenness correction LUTs generated by the correction LUT generating section 140 in correspondence with the projector 10D.

The notification processing section 150 carries out a predetermined notification process on the basis of a result of the computation performed by the correction target value calculating section 130. For example, in a case where a result of the measurement performed by the unevenness measuring apparatus 30 after the image processor 100 has performed the unevenness correction shows that the quality of the tiled image 5 does not satisfy a criterion, the notification processing section 150 carries out the process of displaying an image screen that prompts the user to change the conditions under which the tiled image 5 is displayed. Specifically, the notification processing section 150 carries out the process of displaying, on the screen SC, an image screen that prompts the user to set the overlapping areas 3 again. The evaluation of whether or not the quality of the tiled image 5 satisfies a criterion may be performed by the notification processing section 150. The value of the criterion of the evaluation can be a value inputted via the operation section 130 or a value set in advance and stored in the notification processing section 150.

The correction processing sections 161 to 164 (correction section, output section) use the unevenness correction LUTs stored in the correction LUT storage sections 171 to 174 (storage section) to correct the image data divided by the image division processing section 110. The correction processing section 161 acquires an unevenness correction LUT selected by the correction LUT selecting section 120 from the unevenness correction LUTs stored in the correction LUT storage section 171. The correction processing section 161 uses the unevenness correction LUT acquired from the correction LUT storage section 171 to perform the unevenness correction. To reduce the storage capacity of the correction LUT storage section 171, each unevenness correction LUT contains unevenness correction values corresponding to a predetermined number of lattice points in the space defined by three axes along the vertical direction of the screen, the horizontal direction of the screen, and the grayscale direction. The correction processing section 161 performs known interpolation computation, such as linear interpolation and curve interpolation, on the unevenness correction values at the lattice points to find inter-lattice-point unevenness correction values and uses the thus found unevenness correction values to produce an image signal having undergone the unevenness correction.

Similarly, the correction processing section 162 reads and acquires an unevenness correction LUT selected by the correction LUT selecting section 120 from the correction LUT storage section 172 and performs the unevenness correction. The correction processing section 163 reads and acquires an unevenness correction LUT selected by the correction LUT selecting section 120 from the correction LUT storage section 173 and performs the unevenness correction. The correction processing section 164 reads and acquires an unevenness correction LUT selected by the correction LUT selecting section 120 from the correction LUT storage section 174 and performs the unevenness correction.

The operation section 300 is an input device integrated with the image processor 100 or connected to the image processor 100. The operation section 300 receives the user's input relating, for example, to the display mode setting such as discrete image display and tiled image display, the size and resolution of the tiled image 5 to be displayed, and the sizes and positions of the overlapping areas 3.

Figure 6:
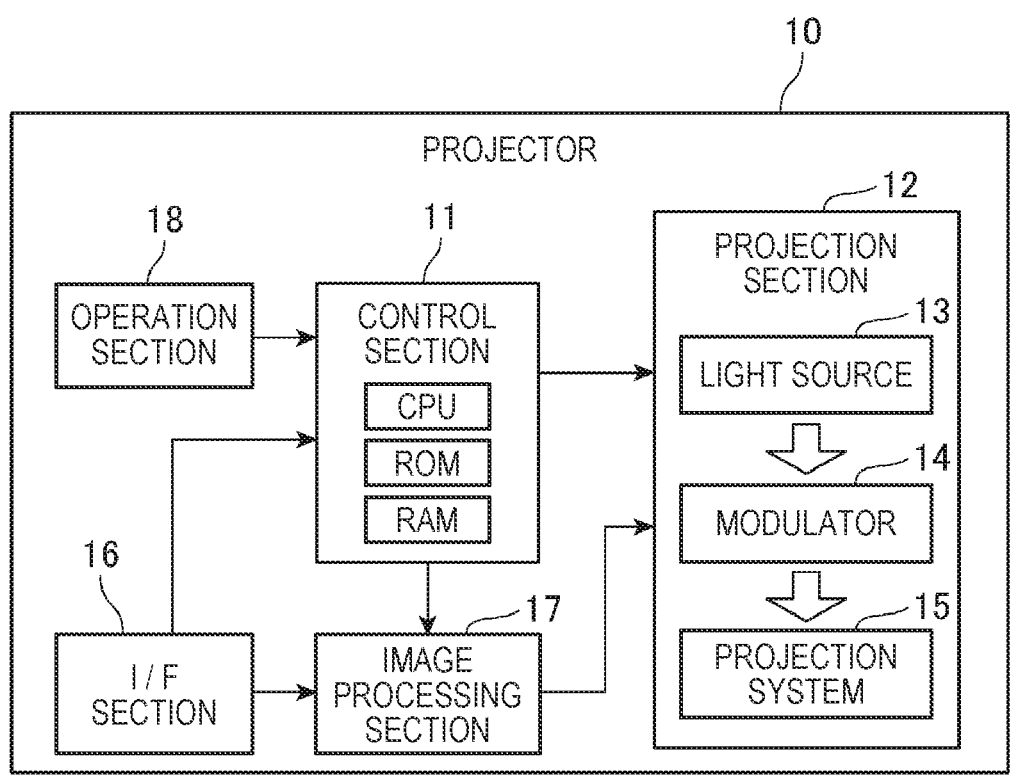
FIG. 6 is a functional block diagram of a projector.

FIG. 6 is a functional block diagram of each of the projectors 10. In the first embodiment, since the projectors 10A, 10B, 10C, and 10D have the same configuration, the configuration of the projectors will be collectively described with reference to FIG. 6.

Each of the projectors 10 includes a control section 11, which controls the projector 10, and further includes a projection section 12, an interface section 16, an image processing section 17, and an operation section 18.

The control section 11 includes a CPU that executes a program to control the projector 10. The control section 11 further includes a ROM (read only memory) that stores the program executed by the CPU in a nonvolatile manner and a RAM (random access memory) that forms a work area used by the CPU.

The projection section 12 includes a light source 13, a modulator 14, and a projection system 15. The light source 13 includes a xenon lamp, an ultrahigh-pressure mercury lamp, an LED (light emitting diode), a laser light source, or any other light source. The modulator 14 modulates light emitted from the light source 13 to generate image light, with which the projection system 15 is irradiated. The modulator 14 includes, for example, three transmissive liquid crystal panels or reflective liquid crystal panels corresponding to the RGB three primary colors. The modulator 14 may instead include a DMD (digital mirror device) and a color wheel.

The projection system 15 guides the image light modulated by the modulator 14 toward the screen SC and brings the image light into focus on the screen SC. The projection system 15 may include a zoom mechanism that enlarges or reduces an image displayed on the screen SC and a focus mechanism that performs focus adjustment.

The interface (I/F) section 16 is connected to the image processor 100 and acquires divided image data 6 inputted from the image processor 100.

The image processing section 17 performs image processing on the divided image data 6 inputted via the interface section 16 under the control of the control section 11. The processes carried out by the image processing section 17 are, for example, the process of determining whether the input data is formed of a 3D (stereo) image or a 2D (planar) image, a resolution conversion process, a frame rate conversion process, a distortion correction process, a digital zooming process, a color tone correction process, and a luminance correction process. The image processing section 17 carries out a process specified by the control section 11 and carries out the process by using a parameter inputted from the control section 11 as required. The image processing section 17 can, of course, carry out a combination of a plurality of the processed described above. The image processing section 17 outputs an image signal for displaying the processed image to the modulator 14, and the modulator 14 draws the image.

The control section 11 detects the divided image data 6 inputted via the interface section 16 and causes the image processing section 17 to perform the image processing. The control section 11 controls the light source 13 in the projection section 12 to cause the light source 13 to start and stop light emission and further controls the drawing operation performed by the modulator 14 to allow the projection section 12 to project the projection image 2 based on the divided image data 6. The operation section 18 is connected to the control section 11. The operation section 18 is an operation panel including a variety of switches and provided, for example, on an enclosure (not shown) of the projector 10. The operation section 18 includes, for example, a power switch that powers on and off the projector 10, a switch that starts projection, and a switch that invokes a setting menu. The operation section 18 may further include an indicator that goes on, blinks, or goes off in accordance with the action state of the projector 10. In this case, the control section 11 may control the light emitting action of the indicator on the operation section 18.

Figure 7:
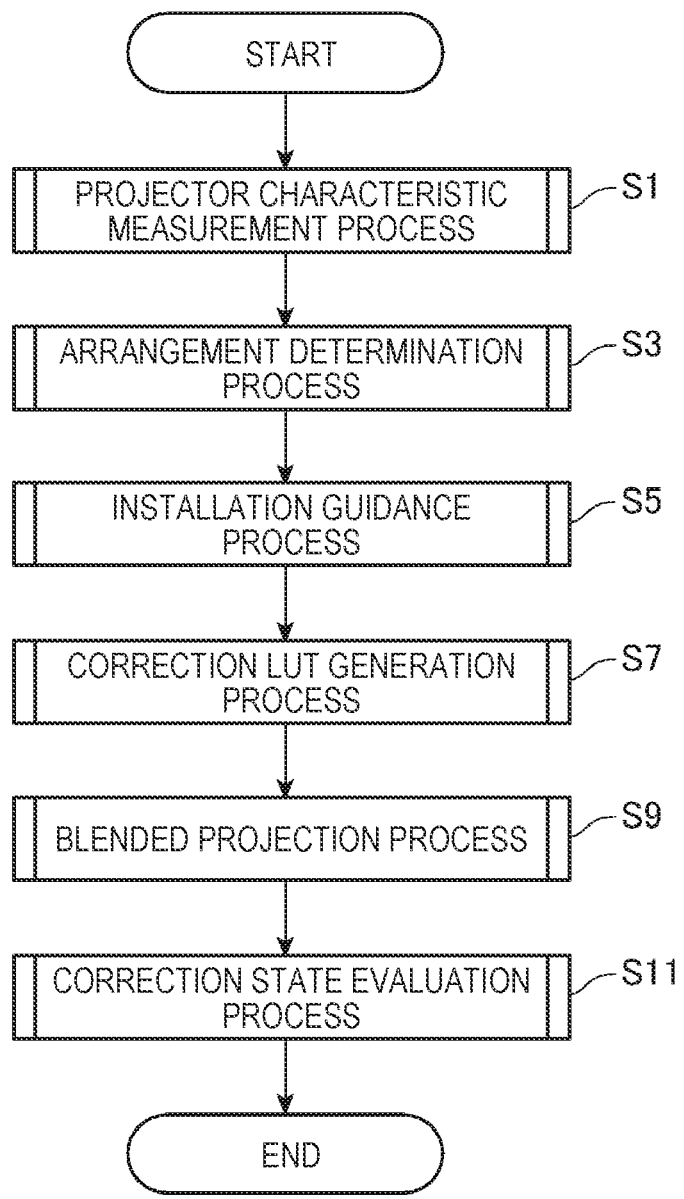
FIG. 7 is a flowchart showing the action of the projection system.

FIG. 7 is a flowchart showing the action of the projection system 1.

The image processor 100 causes the unevenness measuring apparatus 30 to operate and carries out a projector characteristic measurement process (step S1) in accordance with operation performed on the operation section 300.

Figure 8:
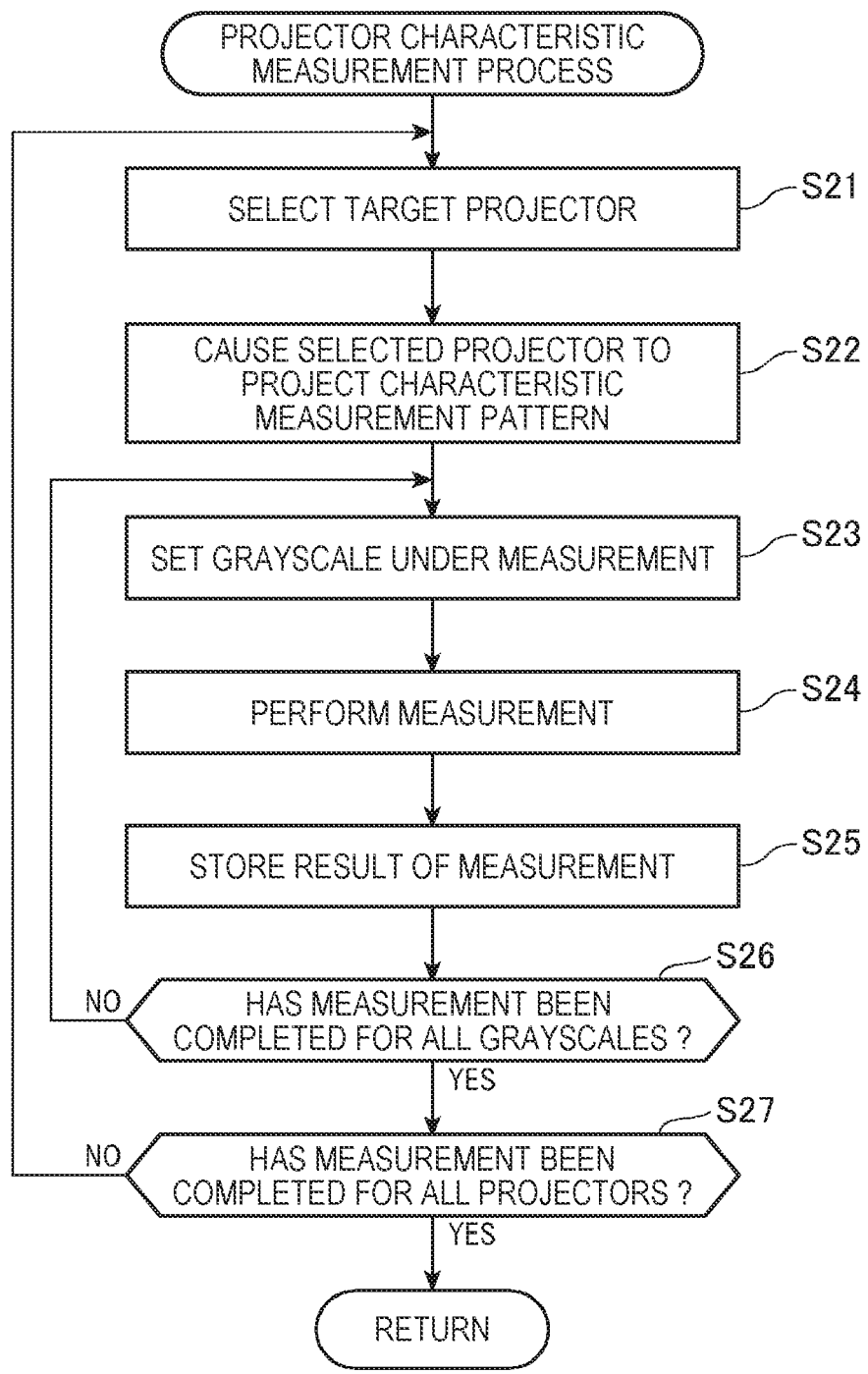
FIG. 8 is a flowchart showing a projector characteristic measurement process.

FIG. 8 is a flowchart showing the projector characteristic measurement process in detail.

In the projector characteristic measurement process, the characteristics of the plurality of projectors 10 may be measured at the same time. In the present embodiment, however, the characteristic measurement is performed on the four projectors 10 one by one. The projector characteristic measurement process is carried out, for example, under the control of the image division processing section 110 of the image processor 100.

The image division processing section 110 selects a projector 10 to be measured (step S21). The image division processing section 110 outputs image data on a characteristic measurement pattern to the selected projector 10 and causes it to project the characteristic measurement pattern (step S22). In step S22, the image processor 100 deactivates the unevenness correction performed by the correction processing section corresponding to the projector 10 that is projecting the characteristic measurement pattern out of the correction processing sections 161 to 164. The intrinsic characteristics of the projector 10 can thus be measured. In this process, the image supply apparatus 20 may supply image data on the characteristic measurement pattern to the image processor 100. Instead, the image division processing section 110 may generate image data on the characteristic measurement pattern on the basis of image data supplied from the image supply apparatus 20 or image data stored in advance. In a case where the projector under measurement is the projector 10A, the image processor 100 causes the correction processing section 161 to output the image data on the characteristic measurement pattern to the projector 10A. In a case where the projector under measurement is any of the projectors 10B to 10D, the image processor 100 causes the corresponding one of the correction processing sections 162 to 164 to output the image data on the characteristic measurement pattern to the projector 10 under measurement.

The measurement pattern is, for example, an full-screen raster image having a uniform color, W (white), R (red), G (green), or B (blue), and a uniform grayscale across the entire image. Measurement patterns different from one another in terms of grayscale are used. For example, in a case where the depth of the grayscale is 8 bit (0 to 255), W255 (raster image having W grayscale of 255) is used. In this case, W224, W192, W160, W128, W096, W064, W032, and W000 (black) are also used. The same holds true for the other colors, R, G, and B. For example, R255, R224, . . . , R64, R32, G255, . . . , G64, G32, B255, . . . , B64, and B32, and other raster images are used as the measurement patterns. The image division processing section 110 sequentially generates these measurement patterns having the grayscales and colors described above and outputs the measurement patterns to the correction processing sections 161 to 164.

In step S22, the projector 10 under measurement starts projection. The image division processing section 110 subsequently sets the grayscale of the measurement pattern to be outputted to the projector 10 at a grayscale under measurement (step S23), and the unevenness measuring apparatus 30 measures the projection image 2 on the screen SC (step S24). The image processor 100 acquires measured values inputted from the unevenness measuring apparatus 30 and temporality stores the measured values in a RAM that is not shown (step S25). The image processor 100 evaluates whether or not the measurement has been completed for all grayscales set in advance as measurement targets (step S26), and when a grayscale that has not undergone the measurement is left (No in step S26), the image division processor 100 returns to step S23.

When the measurement has been completed for all grayscales set in advance as measurement targets (Yes in step S26), the image division processing section 110 evaluates whether or not the measurement has been completed for all the projectors 10 (step S27). When a projector 10 that has not undergone the measurement is left (No in step S27), the image division processing section 110 returns to step S21. When the measurement has been completed for all the projectors 10 (Yes in step S27), the image processor 100 returns to the processes in FIG. 7.

In steps S23 to S26, image data on measurement patterns different from one another in terms of grayscale are sequentially outputted to the projector 10 under measurement, and the measurement is performed, whereby the measurement is performed for a plurality of set measurement grayscales. The measurement patterns are W, R, G, and B raster images, as described above.

The projector characteristic measurement process allows acquisition of two-dimensional distribution information on in-plane XYZ tristimulus values in the form of values measured by the unevenness measuring apparatus 30. The measured values are produced for the projection image 2 projected by each of the projectors 10 and in correspondence with the plurality of W, R, G, and B grayscales.

Referring back to FIG. 7, after the projector characteristic measurement process, the image processor 100 carries out an arrangement determination process (step S3).

Figure 9:
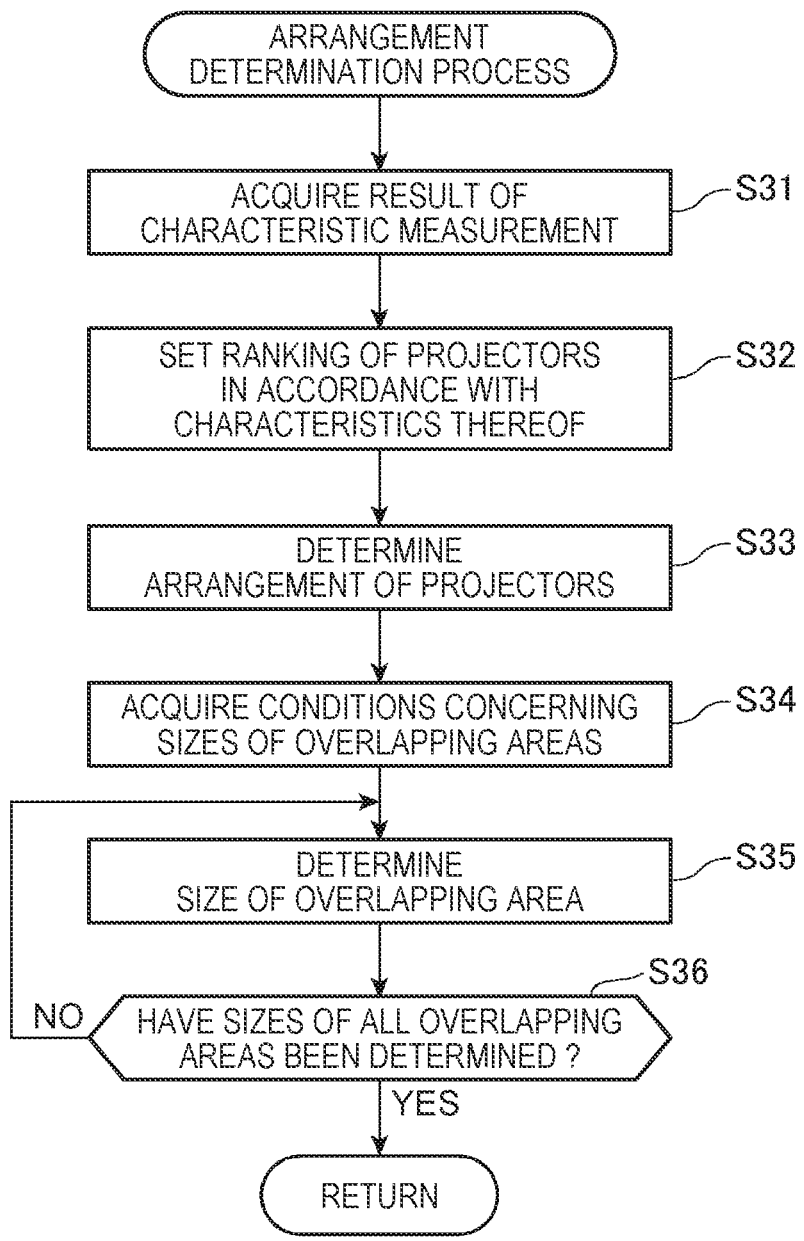
FIG. 9 is a flowchart showing an arrangement determination process.

FIG. 9 is a flowchart showing the arrangement determination process in detail.

The arrangement determining section 180 acquires a result of the measurement in the projector characteristic measurement process (FIG. 8), that is, values measured by the unevenness measuring apparatus 30 (step S31). The arrangement determining section 180 sets the ranking of the projectors 10 on the basis of the acquired result of the measurement (step S32). In step S32, the measured value (in-plane maximum) associated, for example, with the W255 measurement pattern is taken as the maximum luminance, and the ranking is set in descending order of the maximum luminance.

The arrangement determining section 180 determines the arrangement of the projectors 10 in accordance with the ranking of the luminance characteristics of the projectors 10 (step S33). For example, the projectors 10 are arranged in descending order of luminance provide by the projectors 10 in such a way that the projection image 2 from a projector 10 having high luminance is located in a position close to the center of the screen SC. In the example shown in FIGS. 2 to 4, the projector 10C provides the highest luminance, and the luminance provided by the projectors 10B, 10A, and 10D decreases in this order.

The arrangement determining section 180 acquires conditions concerning the sizes of the overlapping areas 3A, 3B, and 3C contained in the tiled image 5 (step S34). The conditions are the size of the tiled image 5, the resolution of the input image data inputted from the image supply apparatus 20, and other factors. The conditions may include a minimum size allocated to each of the overlapping areas.

The arrangement determining section 180 uses the measured values acquired in step S31 to determine the size of any of the overlapping areas 3 contained in the tiled image 5 in accordance with the conditions acquired in step S34 (step S35). The arrangement determining section 180 evaluates whether or not the sizes of all the overlapping areas 3 contained in the tiled image 5 have been determined (step S36). When an overlapping area 3 that has not undergone the size determination is left (No in step S36), the arrangement determining section 180 carries out the process in step S35 again. When the sizes of all the overlapping areas 3 have been determined (Yes in step S36), the image processor 100 returns to the processes in FIG. 7.

It is noted that the arrangement determining section 180 may calculate the sizes of the plurality of overlapping areas 3 contained in the tiled image 5 by carrying out the process in step S35 once.

In step S35, the arrangement determining section 180 first determines the size of the overlapping area 3B, which is the overlapping area 3 located in a position on the side facing (close to) the center of the arrangement. In this case, it is preferable to determine the size of the overlapping area 3B in such a way that unevenness or ripples of the luminance in the overlapping area 3B can be corrected to a value smaller than or equal to a predetermined level.

In FIG. 3, let Yp1 be the peak luminance on the curve C1, Yp2 be the peak luminance on the curve C2, Yp3 be the peak luminance on the curve C3, and Yp4 be the peak luminance on the curve C4. Further, let P1, P2, P3, and P4 be the positions corresponding to the peak luminance values.

Moreover, let B2R be the boundary position of the overlapping area 3B in the projection image 2B and Yb2$r$ be the luminance on the curve C2 at B2R. Let B3L be the boundary position of the overlapping area 3B in the projection image 2C and Yb31 be the luminance on the curve C3 at B3L.

In FIG. 3, at the center of the overlapping area 3B, the luminance values on the curves C2 and C3 are greatly smaller than the peak luminance. If the decrease is not corrected, a dark area appears at the center of the tiled image 5, and it is therefore feared that display quality of the tiled image 5 decreases. To correct the luminance in the overlapping area 3B to a value close enough to the peak luminance values Yp2 and Yp3 so that the user does not feel strange, the luminance values Yb2$r$ and Yb31 in the positions of the opposite ends of the overlapping area 3B, that is, in the positions B2R and B3L are preferably not too small as compared with the peak luminance value Yp2 or Yp3. The arrangement determining section 180 therefore determines the positions B2R and B3L in such a way that the luminance values Yb2$r$ and Yb31 fall within a range where preferable correction can be made with respect to the peak luminance values Yp2 and Yp3.

The range where preferable correction can be made can be identified, for example, by using a luminance ratio.

For example, the positions B2R and B3L that satisfy the following Expression (1) and (2) may be determined. In Expressions (1) and (2), $\alpha$ represents a reference value of the luminance in the overlapping area 3B with respect to the maximum luminance and is a value set in advance and memorized by the image processor 100.

$$Yb2r/Yp2 > \alpha \quad (1)$$

$$Yb31/Yp3 > \alpha \quad (2)$$

In a case where there is a difference in the peak luminance between the two projection images 2 that form the overlapping area 3 under measurement (overlapping area 3B in the description), as shown in FIG. 3, the boundary positions may be determined in such a way that the condition expressed by one of Expressions (1) and (2) described above is satisfied. In the overlapping area 3B shown in FIG. 3, the difference between the peak luminance Yp3 and the peak luminance Yp2 clearly shows that the luminance decreases from the position P3 to the position P2. In this case, even if the luminance unevenness in the overlapping area 3B can be eliminated, a change in the luminance (decrease in luminance from position P3 to position P2) occurs. Luminance unevenness that causes the user to feel strange can therefore be avoided even if the restriction expressed by Expression (2) described above is not imposed.

The arrangement determining section 180 determines the size of the center-side overlapping area 3 that should be the largest (overlapping area 3B in the description) and then determines the sizes of the other overlapping areas 3. The total sum of the sizes of the overlapping areas 3 in the tiled image 5 has been determined in advance, as described above. Let N be the number of projectors 10, W be the number of horizontally arranged pixels of the projection image 2 from each of the projectors 10, and H be the number of horizontally arranged pixels of the tiled image 5, and the total sum Z of the sizes of the overlapping areas 3 is found by the following Expression (3).

$$Z = W \times N - H \quad (3)$$

In this process, a situation in which the center-side overlapping area 3 has a large size and the large size causes the sizes of the other overlapping areas 3 to be extremely small can also be avoided. That is, a minimum size applied to all the overlapping areas 3 can be set in advance. Let Smin be the minimum size of the overlapping areas 3, and an adjustment width S by which the size of each of the overlapping areas 3 can be increased or decreased is found by the following Expression (4).

$$S = (W \times N - H) - (N-1) \times Smin \quad (4)$$

In this case, the size of the largest overlapping area 3 (overlapping area 3B) is limited to (Smin+S) dots at the maximum.

Referring back to FIG. 7, after the arrangement determination process, the image processor 100 carries out an installation guidance process (step S5).

Figure 10:
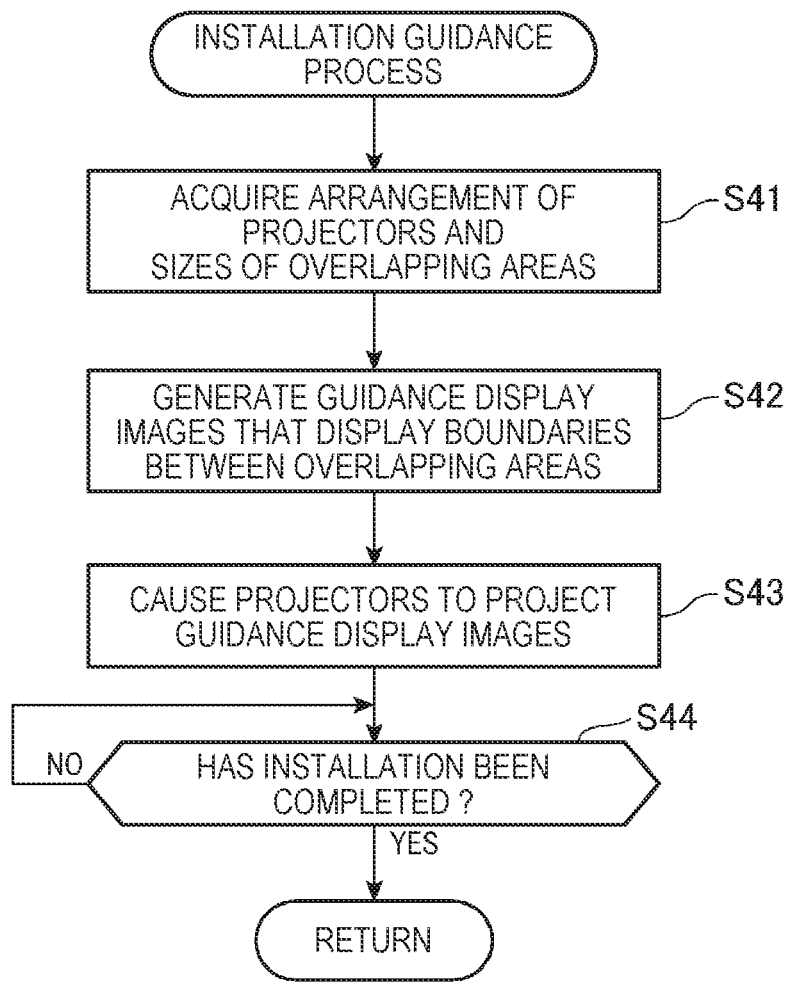
FIG. 10 is a flowchart showing an installation guidance process.

FIG. 10 is a flowchart showing the installation guidance process in detail.

The image division processing section 110 acquires the arrangement order of the projectors 10 and the sizes of the overlapping areas 3, both of which have been determined by the arrangement determining section 180 (step S41). The image division processing section 110 generates guidance images showing the arrangement order of the projectors 10 and the positions of the overlapping areas 3 (step S42). The correction processing sections 161 to 164 output the guidance images to the respective projectors 10 and cause the projectors 10 to project the guidance images (step S43).

In step S42, the image division processing section 110 generates a guidance image containing information, such as letters, representing the position of the projector 10A and an image, such as a straight line, representing the boundary (position A1R in FIG. 3) of the overlapping area 3A in the projection image 2A. In step S43, the image division processing section 110 outputs the generated guidance image to the correction processing section 161, and the correction processing section 161 outputs image data on the guidance image as the divided image data 6A to the projector 10A.

Similarly, in step S42, the image division processing section 110 generates a guidance image containing information representing the position of the projector 10B and an image representing the boundary (position A2L in FIG. 3) of the overlapping area 3A in the projection image 2B and the position B2R. In step S43, the image division processing section 110 outputs the generated guidance image to the correction processing section 162, and the correction processing section 162 outputs image data on the guidance image as the divided image data 6B to the projector 10B.

Further, in step S42, the image division processing section 110 generates a guidance image containing information representing the position of the projector 10C and an image representing the position B3L and the boundary (position C3R in FIG. 3) of the overlapping area 3C in the projection image 2C. In step S43, the image division processing section 110 outputs the generated guidance image to the correction processing section 163, and the correction processing section 163 outputs image data on the guidance image as the divided image data 6C to the projector 10C.

Further, in step S42, the image division processing section 110 generates a guidance image containing information representing the position of the projector 10D and an image representing the boundary (position C4L in FIG. 3) of the overlapping area 3C in the projection image 2D. In step S43, the image division processing section 110 outputs the generated guidance image to the correction processing section 164, and the correction processing section 164 outputs image data on the guidance image as the divided image data 6D to the projector 10D.

The user installs the projectors 10 in accordance with the guidance images projected in step S43. The image division processing section 110 waits until an instruction representing that the installation has been completed is inputted via the operation section 300 (No in step S44), and after the instruction representing that the installation has been completed is inputted (Yes in step S44), the image processor 100 returns to the processes in FIG. 7.

Referring back to FIG. 7, the image processor 100 carries out a correction LUT generation process to generate unevenness correction LUTs corresponding to the projectors 10A, 10B, 10C, and 10D (step S7). The image processor 100 subsequently carries out a blended projection process (step S9). In the blended projection process, the image processor 100 uses the unevenness correction LUTs generated in step S7 to correct the measurement patterns and causes the projectors 10A, 10B, 10C, and 10D to display the corrected measurement patterns.

The image processor 100 then controls the unevenness measuring apparatus 30 to carry out a correction state evaluation process (step S11). In the correction state evaluation process, the image processor 100 measures the projection states of the overlapping areas 3 in the tiled image 5 and evaluates whether or not the luminance unevenness in each of the overlapping areas 3 has been corrected to a value within a set range.

Figure 11:
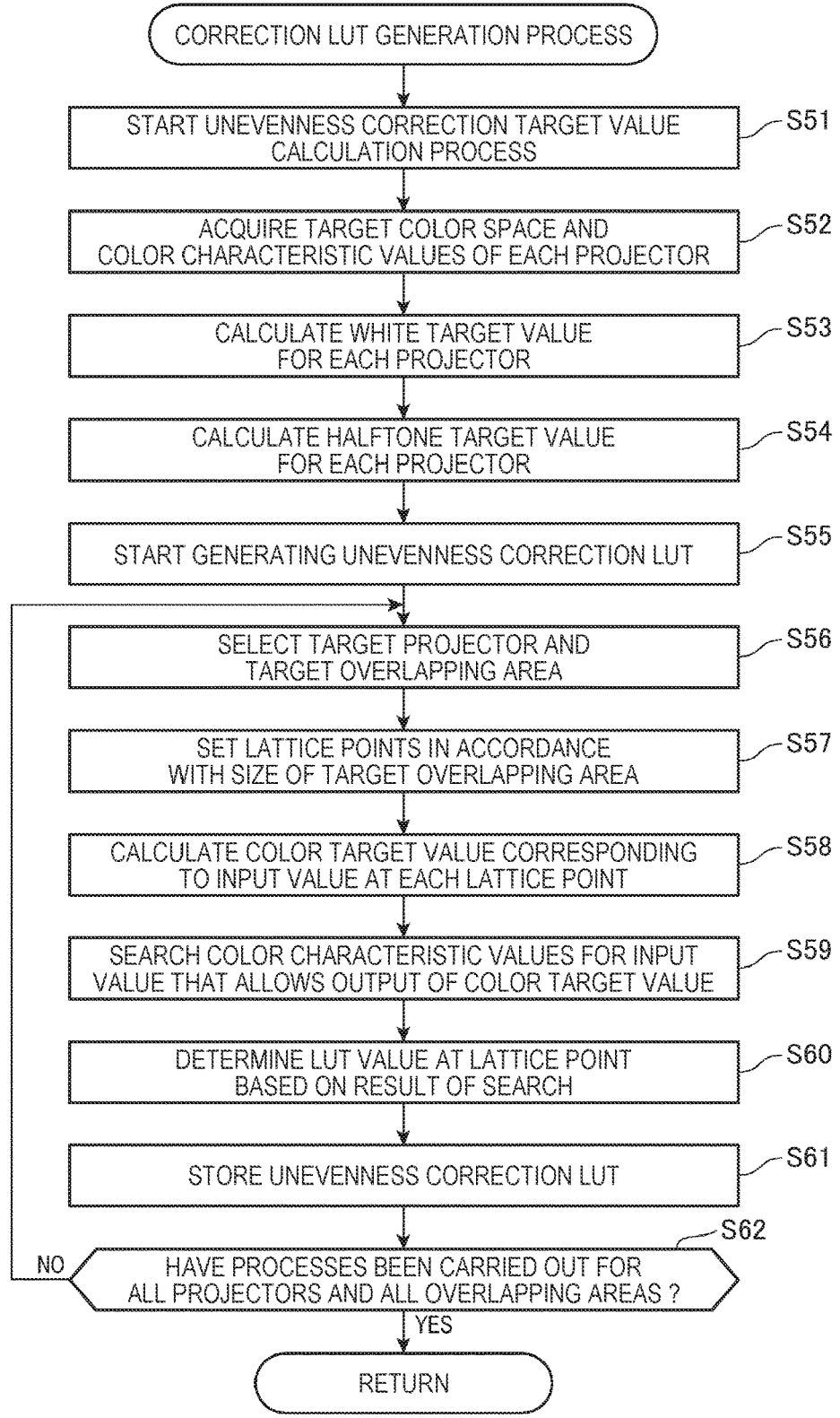
FIG. 11 is a flowchart showing a correction LUT generation process.

FIG. 11 is a flowchart showing the correction LUT generation process in detail.

In the correction LUT generation process, the correction target value calculating section 130 starts an unevenness correction target value calculation process (step S51). The correction target value calculating section 130 acquires the measured values relating to the characteristics of each of the projectors 10 measured in the projector characteristic measurement process (step S1) and further acquires a target color space (step S52). The measured values relating to the characteristics of each of the projectors 10 acquired in step S52 are RGB color characteristic values at each grayscale (XYZ values) for each of the projectors 10.

The correction target value calculating section 130 computes a white target value for each of the projectors in the target color space on the basis of the color characteristic values of the projection images 2 projected by the respective projectors 10 acquired in step S52 (step S53). The correction target value calculating section 130 uses the white target value for each of the projectors 10 computed in step S52 to calculate a halftone target value for each of the projectors (step S54).

In detail, in step S53, the correction target value calculating section 130 calculates, with respect to the luminance in a case where a measurement pattern that is a white solid image is projected, the target values for two projectors 10 that project an overlapping area 3. To calculate the white target value in the overlapping area 3B, the correction target value calculating section 130 first sets, as the projector on which the unevenness correction is performed, the projector 10 corresponding to the lower luminance out of the luminance Yb2r in the position B2R and the luminance Yb31 in the position B3L shown in FIG. 3. In the example shown in FIG. 3, since Yb2r<Yb31, the projector 10B corresponding to the luminance Yb2r is set as the projector on which the unevenness correction is performed. That is, increasing the luminance in the position B2R provided by the projector 10B allows the drop in brightness in the portion between the positions B2R and B3L to be less noticeable.

The correction target value calculating section 130 then detects, in the projection image 2B projected by the projector 10B, which is under correction, the position (called Y2) of a pixel showing luminance equal to the luminance Yb31 in the position B3L in the projection image 2C projected by the projector 10C, which is not under correction. The correction target value calculating section 130 finds a white target value in the projection image 2B in such a way that the area from the pixel position Y2 to the position B3L, which is an end of the projection image 2B, has the luminance Yb31, which is the target value. The process described above is carried out in all the overlapping areas 3 to determine the white target value for each of the projectors 10.

In step S54, the correction target value calculating section 130 carries out the same process in step S53 with respect to the luminance provide when a halftone measurement pattern is projected to calculate the target value.

The image processor 100 subsequently causes the correction LUT generating section 140 to start a correction LUT generation process (step S55).

The correction LUT generating section 140 selects a projector 10 for which a correction LUT is created and further selects a target overlapping area 3 from the overlapping areas 3 contained in the projection image 2 projected by the selected projector 10 (step S56).

The correction LUT generating section 140 acquires the size of the overlapping area 3 selected in step S56 after the size is determined by the arrangement determining section 180 and sets lattice points in accordance with the size (step S57). The correction LUT generating section 140 calculates a color target value corresponding to an input value at each of the lattice points (step S58).

The correction LUT generating section 140 searches the color characteristic values associated with the projector 10 and measured by the unevenness measuring apparatus 30 for an input value that allows output of the color target value calculated in step S58 (step S59). The correction LUT generating section 140 determines a result of the search in step S59 as the LUT value at the lattice point (step S60). The correction LUT generating section 140 determines the LUT values at all the lattice points to create an unevenness correction LUT containing the LUT values and causes the correction LUT storage section corresponding to the projector 10 selected in step S56 out of the correction LUT storage sections 171 to 174 to store the created unevenness correction LUT (step S61).

The correction LUT generating section 140 evaluates whether or not the processes in steps S56 to S61 have been carried out for all the projectors 10 and all the overlapping areas 3 (step S62). When a result of the evaluation shows that the processes have not been carried out for any of the projectors 10 or any of the overlapping areas 3 (No in step S62), the correction LUT generating section 140 returns to step S56. When a result of the evaluation shows that the processes have been carried out for all the projectors 10 and all the overlapping areas 3 (Yes in step S62), the correction LUT generating section 140 terminates the correction LUT generation process.

For example, the approach described in Japanese Patent Application No. 2011-159627 (JP-A-2013-25076) filed by the present applicant can be applied to the correction LUT generation process.

Figure 12:
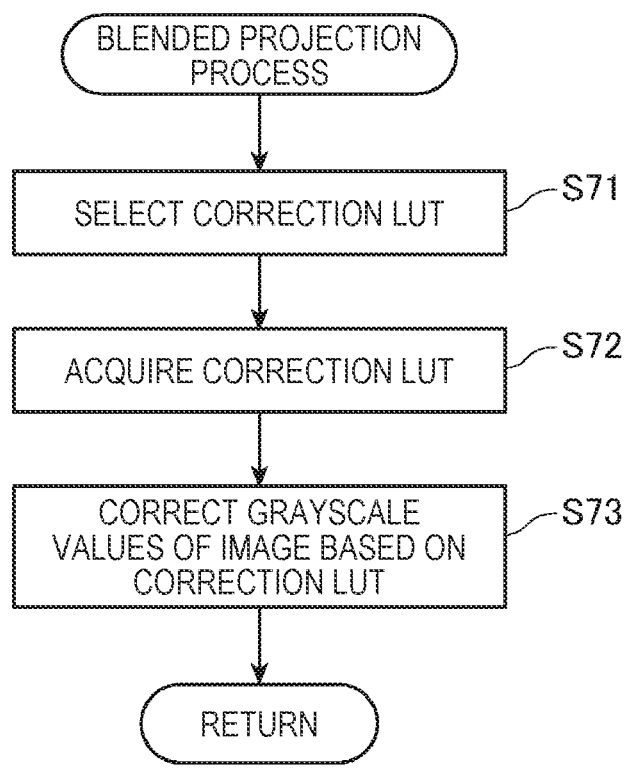
FIG. 12 is a flowchart showing a blended projection process.

FIG. 12 is a flowchart showing the blended projection process in detail.

The image processor 100 causes the correction LUT selecting section 120 to select one of a plurality of unevenness correction LUTs stored in the correction LUT storage section 171 (step S71). The correction LUT selecting section 120 can select a correction LUT that matches the input image data inputted from the image supply apparatus 20. The correction LUT selecting section 120 can instead select an unevenness correction LUT specified by operation accepted by the operation section 300. In the blended projection process described in the present embodiment, projection is performed for the correction state evaluation process, which will be described later, and the projectors 10 therefore display correction patterns or the guidance images. The correction LUT selecting section 120 therefore selects an unevenness correction LUT set in advance in correspondence with the correction state evaluation process. Similarly, the correction LUT selecting section 120 selects one of the plurality of unevenness correction LUTs stored in each of the correction LUT storage sections 172, 173, and 174.

The correction processing section 161 acquires the unevenness correction LUT selected by the correction LUT selecting section 120 from the correction LUT storage section 171 (step S72). The correction processing section 161 corrects the grayscale values in the image data inputted from the image division processing section 110 on the basis of the acquired unevenness correction LUT (step S73).

Similarly, the correction processing sections 162, 163, and 164 acquire the unevenness correction LUTs selected by the correction LUT selecting section 120 from the correction LUT storage sections 172, 173, and 174, respectively (step S72). The correction processing sections 162, 163, and 164 correct the grayscale values in the image data inputted from the image division processing section 110 on the basis of the acquired unevenness correction LUTs (step S73).

Figure 13:
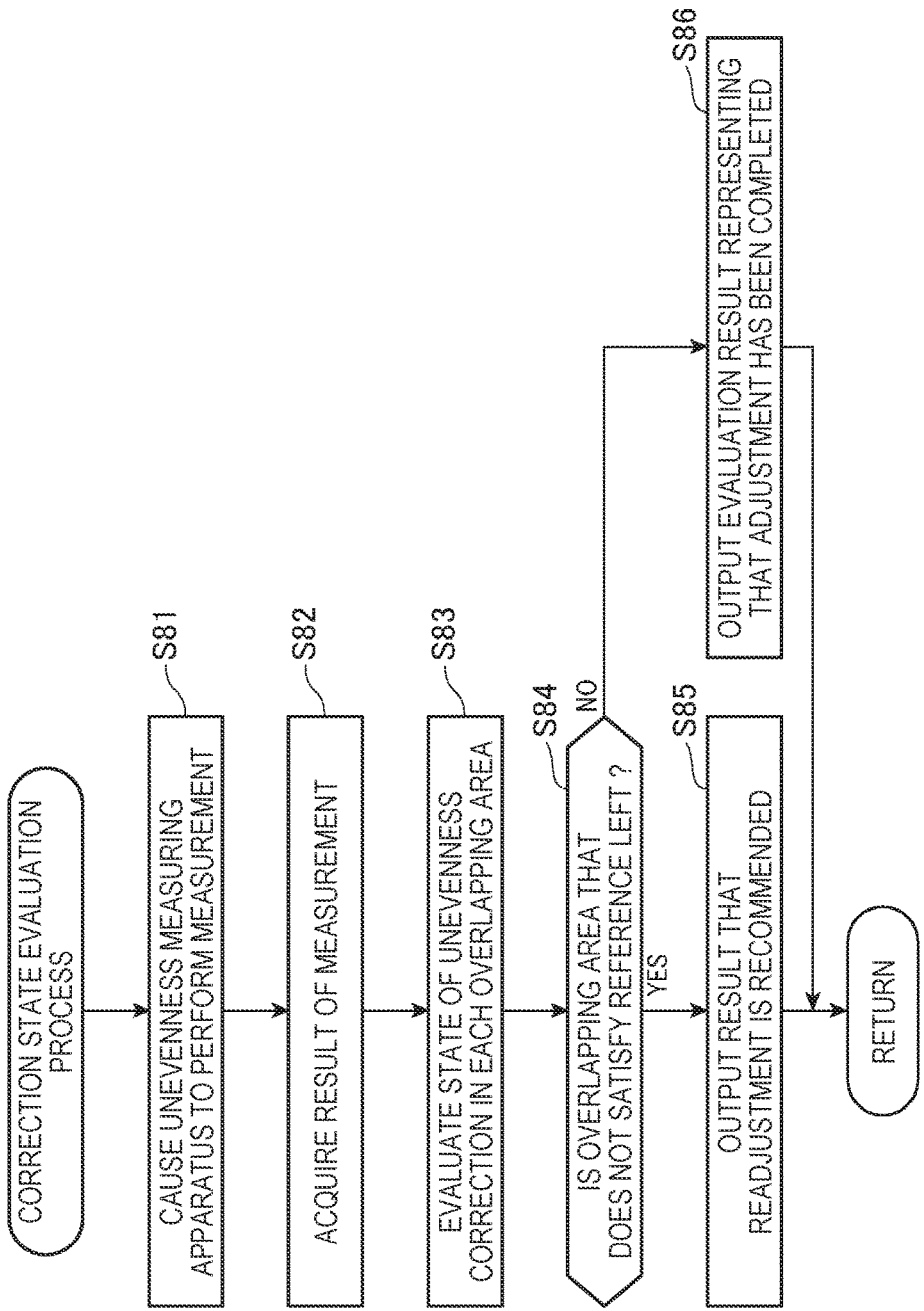
FIG. 13 is a flowchart showing a correction state evaluation process.

FIG. 13 is a flowchart showing the correction state evaluation process in detail.

The image processor 100 controls the unevenness measuring apparatus 30 to cause it to capture an image of the screen SC and calculate measured values on the basis of captured image data (step S81). The image processor 100 acquires the measured values outputted from the unevenness measuring apparatus 30 (step S82) and evaluates the states of the unevenness correction in the overlapping areas 3 contained in the tiled image 5 on the basis of the measured values (step S83).

In step S83, the image processor 100 causes the arrangement determining section 180 to select as a target, for example, any of the overlapping areas 3 contained in the tiled image 5 and acquire the measured values in the target overlapping area 3. The arrangement determining section 180 performs the evaluation, for example, on the basis of whether or not the difference between the minimum luminance and the maximum luminance in the target overlapping area 3 is smaller than a set reference value. The arrangement determining section 180 instead performs the evaluation, for example, on the basis of whether or not the difference between local minimum luminance and local maximum luminance in the target overlapping area 3 is smaller than the set reference value.

In step S84, the image processor 100 evaluates whether or not an overlapping area 3 that does not satisfy the reference is left (step S84). When an overlapping area 3 that does not satisfy the reference is left (Yes in step S84), the image processor 100 outputs a result representing that readjustment is recommended (step S85). When no overlapping area 3 that does not satisfy the reference is left (No in step S84), the image processor 100 outputs a result representing that the adjustment has been completed (step S86).

In steps S85 and S86, the image processor 100, for example, causes the projectors 10 to project a letter string or an image representing a result of the evaluation. The image processor 100 may further cause the notification processing section 150 to perform notification corresponding to a result of the evaluation.

As described above, the projection system 1 according to the first embodiment to which the invention is applied includes three or more projectors 10, and each of the projectors 10 includes the projection section 12, which projects image light to form the projection images 2 on a projection surface. The projectors 10 are so arranged that the three or more projection images 2 projected by the three or more projectors 10 form the tiled image 5. The projection image 2 projected by one of the projectors 10 and the projection image 2 projected by another one of the adjacent projectors 10 form an overlapping area 3, where the two projection images 2 overlap with each other, and among the thus formed overlapping areas 3, the size of one of the overlapping areas 3 differs from the sizes of the other overlapping areas 3. Therefore, in the case where the projection images 2 projected by the three or more projectors 10 are so arranged as to include the overlapping areas 3 to form the tiled image 5, providing a difference in size among the overlapping areas 3 allows precise adjustment of part of the overlapping areas 3. Therefore, for example, unevenness in an overlapping area 3 located in a noticeable position in the tiled image 5 can be precisely adjusted. The unevenness in the overlapping areas 3 in the tiled image 5 can therefore be effectively corrected.

It is preferable that the projection system 1 includes four or more projectors 10 and that the projectors 10 are so arranged that three or more overlapping areas 3 are arranged in a predetermined direction in the tiled image 5. The overlapping area 3 located in a position on the side facing the center of the tiled image 5 in the horizontal direction is larger than the overlapping areas 3 located on the sides facing the ends of the tiled image 5. Therefore, in the case where projection images 2 projected by the four or more projectors 10 are so arranged as to include the overlapping areas 3 to form the tiled image 5, providing a difference in size among the overlapping areas 3 allows precise adjustment of part of the overlapping areas 3. Therefore, for example, in the tiled image 5 containing three or more overlapping areas 3, unevenness in an overlapping area 3 located in a position close to the center of the tiled image 5 can be precisely adjusted. The unevenness in the overlapping areas 3 in the tiled image 5 can therefore be effectively corrected. The projectors 10 may instead be arranged in the vertical direction, and the predetermined direction described above may be the horizontal, vertical, or any other direction.

Further, the sizes of the overlapping areas 3 in the predetermined direction in which the plurality of projectors 10 are arranged are preferably so set that the size of any of the overlapping areas 3 differs from the sizes of the other overlapping areas 3. In the present embodiment, the projectors 10 are arranged in the horizontal direction, and the width or the size of the overlapping area 3 along the horizontal direction differs from the widths or the sizes of the other overlapping areas 3. The configuration described above, in which a difference in size among the overlapping areas 3 is provided in the direction in which the projectors 10 are arranged, allows precise adjustment of unevenness correction in the predetermined direction in part of the overlapping areas 3. For example, in a case where a plurality of projectors 10 are arranged in the vertical direction, the size (height) of the overlapping area 3 in the vertical direction may be so set as to be greater than the sizes of the other overlapping areas 3. The vertical direction or the horizontal direction may be specified with respect to gravity or may be a direction specified with respect to the tiled image 5 on the screen SC.

Further, the plurality of projectors 10 are so arranged that the luminance of one or more projection images 2 located on the side facing the center of the tiled image 5 among the plurality of projection images 2 is higher than the luminance of the other projection images 2 located in positions on the side facing the ends of the tiled image 5. Precise adjustment can therefore be made on the overlapping area 3 in a noticeable position in the tiled image 5.

Further, the projection system 1 includes the image processor 100. The image processor 100 includes the arrangement determining section 180, which determines the arrangement of the plurality of projectors 10 on the basis of the characteristics of each of the projectors 10. The image processor 100 further includes the image division processing section 110, which causes the projectors 10 to project guidance images showing the installation state of the projectors 10 in accordance with the arrangement determined by the arrangement determining section 180. Therefore, the arrangement can be determined on the basis of the characteristics of the projectors 10, and the task of installing the projectors 10 can be guided in accordance with the determined arrangement. Unevenness in one or more overlapping areas 3 contained in the tiled image 5 can therefore be more precisely adjusted. Further, the task of installing the projectors 10 can be assisted.

The image division processing section 110 in the image processor 100 functions as a divider section that divides an image to be projected to generate divided images to be projected by the projectors 10. The image processor 100 further includes the correction LUT storage sections 171 to 174, which store the unevenness correction LUTs, and the correction processing sections 161 to 164, which correct the divided images generated by the divider section on the basis of the unevenness correction LUTs stored in the correction LUT storage sections 171 to 174. The correction processing sections 161 to 164 function as an output section that outputs the corrected divided images to the respective projectors 10. Therefore, the plurality of projectors 10 are installed in accordance with the arrangement determined on the basis of the characteristics of the projectors 10, and images in which unevenness in the overlapping areas 3 is corrected are outputted to the thus installed projectors 10, whereby the tiled image 5 in which the overlapping areas 3 are precisely adjusted can be projected.

The image division processing section 110 generates the guidance images, which show the installation state of the projectors 10, in accordance with the arrangement determined by the arrangement determining section 180, and the correction processing sections 161 to 164 output the guidance images generated by the image division processing section 110 to the respective projectors 10. The above-mentioned function of the image processor 100 can assist the task of installing the projectors 10.

The image processor 100 further includes the correction LUT table generating section 140, which generates unevenness correction LUTs, in accordance with which unevenness in the overlapping areas 3 is corrected, on the basis of the arrangement of the plurality of projectors 10 determined by the arrangement determining section 180. The correction LUT storage sections 171 to 174 store the unevenness correction LUTs generated by the correction LUT table generating section 140. The above-mentioned function of the image processor 100 can generate unevenness correction LUTs for adjusting the overlapping areas 3 and supply the projectors 10 with adjusted images.

Among the overlapping areas 3, the overlapping area 3 located on the side facing the center of the tiled image 5 (overlapping area 3B, for example) has a size that allows the correction processing sections 161 to 164 to correct a difference in luminance among the overlapping areas 3 to a value that falls within a set range. Therefore, in the tiled image 5, the overlapping area 3 located in a noticeable center-side position can be more precisely corrected.

The tiled image 5 includes a first overlapping area as one of the overlapping areas 3, and the arrangement determining section 180 carries out a size determination process of determining the size of the first overlapping area 3 on the basis of the luminance values provided by first and second projectors that project images that form the first overlapping area. For example, in a case where the first overlapping area is the overlapping area 3B, the arrangement determining section 180 determines the size of the overlapping area 3B in the arrangement determination process on the basis of the luminance characteristics of the projectors 10B and 10C, which project images that form the overlapping area 3B. In this case, the projector 10B corresponds to the first projector, and the projector 10C corresponds to the second projector. In each of a projection image 2 projected by the first projector and a projection image 2 projected by the second projector, the arrangement determining section 180 finds the ratio of the luminance at the boundary of the first overlapping area to the luminance of the projection image 2, and the arrangement determining section 180 determines the size of the first overlapping area on the basis of the obtained ratios. The sizes of the overlapping areas 3 can thus be so determined as to be suitable for unevenness adjustment. The unevenness in the overlapping areas 3 in the tiled image 5 can therefore be more precisely corrected.

The projection system 1, the method for adjusting the arrangement of the projectors 10 in the projection system 1, and other points according to the first embodiment of the invention have been described. The invention is not limited to the first embodiment described above.

Second Embodiment

Figure 14:
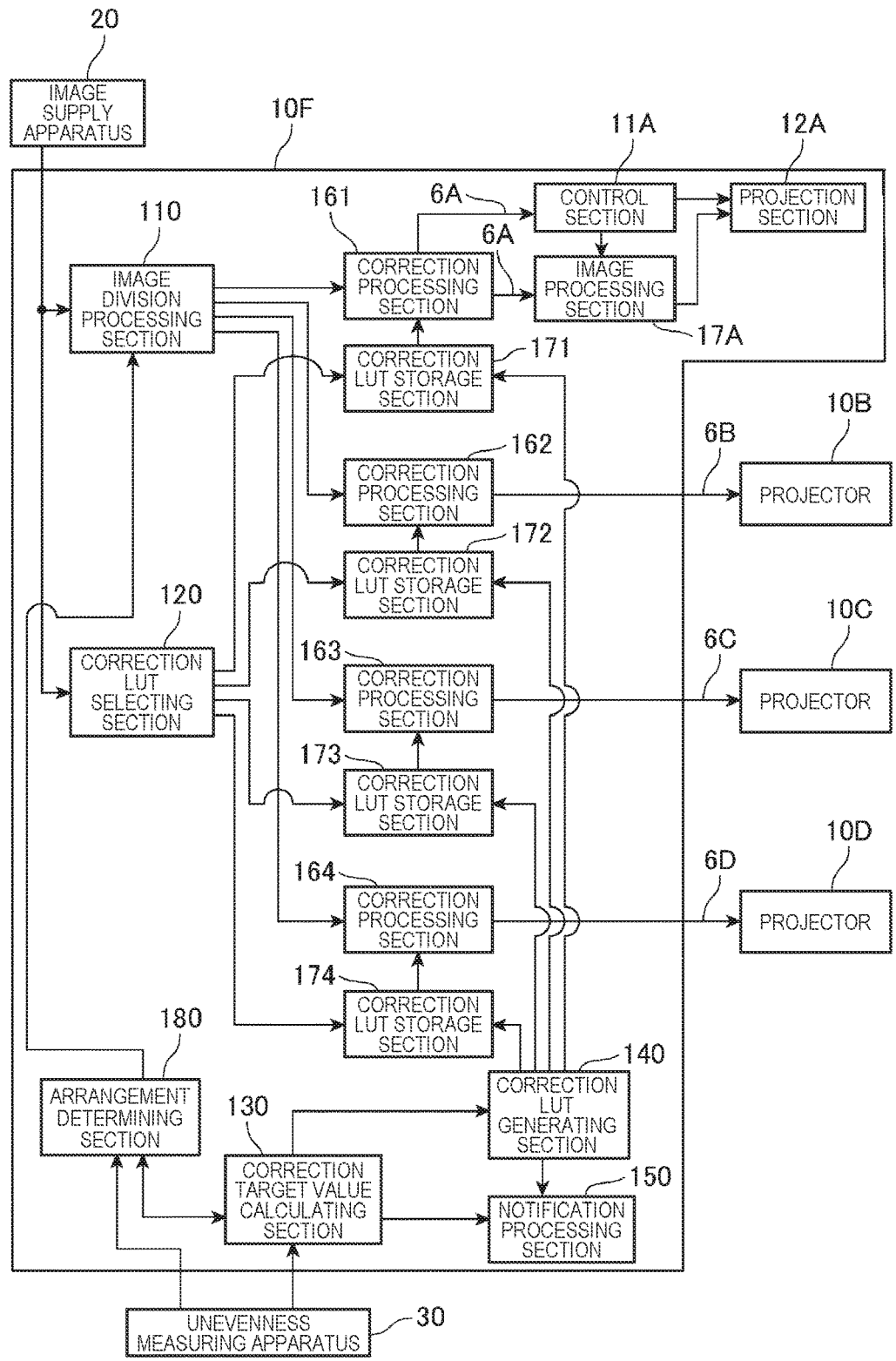
FIG. 14 is a functional block diagram showing the configuration in a second embodiment.

FIG. 14 is a functional block diagram showing, as a second embodiment to which the invention is applied, the configuration in which the image processor 100 and the projector 10A in the projection system 1 are replaced with a projector 10F.

The projector 10F includes a control section 11A, a projection section 12A, and an image processing section 17A as the configuration corresponding to the control section 11, the projection section 12, and the image processing section 17 provided in the projector 10A. The functions of the control section 11A, the projection section 12A, and the image processing section 17A are the same as those of the control section 11, the projection section 12, and the image processing section 17.

The projector 10F further includes the image division processing section 110, the correction LUT selecting section 120, the correction target value calculating section 130, the correction LUT table generating section 140, the notification processing section 150, and the arrangement determining section 180, which are provided in the image processor 100. The projector 10F further includes the correction processing sections 161 to 164 and the correction LUT storage sections 171 to 174. The correction processing sections 162, 163, and 164 are connected to the projectors 10B, 10C, and 10D, respectively. The projector 10F is connected to the image supply apparatus 20, the unevenness measuring apparatus 30, and the operation section 300, which is not shown. The configuration described above allows the projector 10F to function in the same manner as the image processor 100.

In the projector 10F, the correction processing section 161 is connected to the control section 11A and the image processing section 17A. The control section 11A and the image processing section 17A operate on the basis of the divided image data 6A inputted from the correction processing section 161.

In the configuration shown in FIG. 14, among the plurality of projectors 10 provided in the projection system 1, the projector 10F also functions as the image processor 100. In this configuration, the projector 10F can be called a master projector. According to this configuration, the advantageous effects described in the first embodiment can be provided. Further, the image processor 100 does not need to be provided separately from the projectors 10.

The projection system 1 to which the invention is applied can therefore be achieved by connecting the projector 10F, which is the master projector having the functions of the image processor 100, to the plurality of projectors 10B, 10C, and 10D.

In each of the embodiments described above, the configuration in which four projectors 10 are provided is presented by way of example, and a configuration in which a greater number of projectors 10 are provided can be similarly achieved.

Further, in each of the embodiments described above, the color space may be an $L^*u^*v^*$ space or an $L^*a^*b^*$ space.

In each of the embodiments described above, a front-projection-type projection system in which a plurality of projectors 10 in front of the screen SC project image light is presented by way of example, but not necessarily in the invention. For example, a rear-projection type configuration in which the projectors 10 are installed behind the screen SC may be employed. In this case, the unevenness measuring apparatus 30 may be installed in front of the screen SC.

The unevenness measuring apparatus 30 can be incorporated in any of the projectors 10. That is, the imaging section capable of capturing an image of the tiled image 5 projected on the screen SC may be provided in any of the projectors 10.

The functional blocks shown in FIGS. 1, 5, 6, and 14 represent the functional configurations of the projectors and the image processor 100 and are not necessarily implemented in a specific form. That is, hardware corresponding to each of the functional blocks in the figures is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software. In addition, the specific detailed configuration of each of the other portions in the apparatus that form the projection system 1 can be arbitrarily changed to the extent that the change does not depart from the substance of the invention.

The invention may be configured in an aspect of a program executed by a computer to achieve the action of the projection system 1 described above, a recording medium on which the programs is so recorded as to be readable by a computer, or a transmission medium that transmits the program. That is, the invention can be configured as a method for controlling the projection system 1, a method for controlling the image processor 100 or the projector 10F, and a program for achieving the adjustment method in the projection system 1. The recording medium described above can be a magnetic recording medium, an optical recording medium, or a semiconductor memory device. Specific example of the recording medium may include a flexible disk, an HDD (hard disk drive), a CD-ROM (compact disk read only memory), a DVD (digital versatile disk), a Blu-ray (registered trademark) disc, a magneto-optical disk, a flash memory, a portable recording medium, such as a card-shaped recording medium, or an immobile recording medium. The recording medium described above may instead be a RAM (random access memory), a ROM (read only memory), or an HDD or any other nonvolatile storage device that are internal storage devices provided in each apparatus provided in the projection system 1 or in an external apparatus connected to the apparatus.

What is claimed is:

1. A projection system comprising:
   three or more projectors; and
   an image processor including:
      an arrangement determining section that is configured to determine an arrangement of the projectors based on characteristics of each of the projectors;
      a guidance display control section that is configured to cause the projectors to project images showing an installation state of the projectors in accordance with the arrangement determined by the arrangement determining section;
      a divider section that is configured to divide an image to be projected to generate divided images to be projected by the projectors;
      a storage section that is configured to store correction data;
      a correction section that is configured to correct the divided images generated by the divider section based on the correction data stored in the storage section; and
      an output section that is configured to output the divided images corrected by the correction section to the projectors, wherein:
   each of the projectors includes a projection section that projects image light to form a projection image on a projection surface;
   the projectors are arranged such that the three or more projection images projected by the three or more projectors form a tiled image;
   the projection image projected by one of the projectors and the projection image projected by another one of the projectors adjacent to the one of the projectors form an overlapping area where the projection images overlap with each other,
   one of the overlapping areas differs from the other overlapping areas in terms of size;
   the tiled image includes a first overlapping area as one of the overlapping areas;
   the arrangement determining section is configured to carry out a size determination process of determining a size of the first overlapping area based on luminance provided by a first one of the projectors and a second one of the projectors that project images that form the first overlapping area; and
   in the size determination process, in each of the image projected by the first one of the projectors and the image projected by the second one of the projectors, the arrangement determining section is configured to find a ratio of luminance at a boundary of the first overlapping area to peak luminance of the projection image and determine the size of the first overlapping area based on the obtained ratios.

2. The projection system according to claim 1, wherein one of the overlapping areas differs from the other overlapping areas in terms of size in a predetermined direction in which the projectors are arranged.

3. The projection system according to claim 1,
   wherein the projectors are formed of four or more projectors,
   the projectors are so arranged that the three or more overlapping areas are arranged in a predetermined direction in the tiled image, and
   the overlapping area located in a position on a side facing a center of the tiled image in the predetermined direction is larger than the overlapping areas located in positions on sides facing ends of the tiled image.

4. The projection system according to claim 3, wherein the overlapping area located in the position on the side facing the center of the tiled image in the predetermined direction is larger than the overlapping areas located in the positions on the sides facing the ends of the tiled image in terms of size in a predetermined direction which the projectors are arranged.

5. The projection system according to claim 1, wherein the plurality of projectors are so arranged that among the plurality of projection images, one or more projection images located on a side facing a center of the tiled image have luminance higher than luminance of the other projection images located in positions on sides facing ends of the tiled image.

6. The projection system according to claim 1,
   wherein the guidance display control section generates the images showing the installation state of the projectors in accordance with the arrangement determined by the arrangement determining section, and
   the output section outputs the images generated by the guidance display control section to the projectors.

7. The projection system according to claim 1, further comprising a correction data generating section that generates the correction data to correct unevenness in the overlapping areas based on the arrangement of the plurality of projectors determined by the arrangement determining section,
   wherein the storage section stores the correction data generated by the correction data generating section.

8. The projection system according to claim 1, wherein among the overlapping areas, the overlapping area located in a position facing a center of the tiled image has a size that allows the correction section to correct a difference in luminance among the overlapping areas to a value that falls within a set range.

9. A method for adjusting a projection system that includes three or more projectors and projects a tiled image containing projection images projected by the projectors, the method comprising:
   determining arrangement of the projectors based on characteristics of each of the projectors;
   arranging the projectors in such a way that the three or more projection images projected by the three or more projectors form the tiled image; and
   projecting images showing an installation state of the projectors in accordance with the determined arrangement;
   dividing an image to be projected to generate divided images to be projected by the projectors;
   storing correction data;
   correcting the divided images based on the stored correction data;
   outputting the corrected divided images corrected to the projectors;
   adjusting projection directions of the projectors in such a way that the projection image projected by one of the projectors and the projection image projected by another one of projectors adjacent to the one of the projectors form an overlapping area where the projection images overlap with each other and one of the overlapping areas differs from the other overlapping areas in terms of size, the tiled image including a first overlapping area as one of the overlapping areas;
   projecting image light to form a projection image on a projection surface;

determining a size of the first overlapping area based on luminance provided by a first one of the projectors and a second one of the projectors that project images that form the first overlapping area; and in determining the size, in each of the image projected by the first one of the projectors and the image projected by the second one of the projectors, finding a ratio of luminance at a boundary of the first overlapping area to peak luminance of the projection image and determining the size of the first overlapping area based on the obtained ratios.

* * * * *